(12) United States Patent
Wu et al.

(10) Patent No.: US 10,469,251 B2
(45) Date of Patent: Nov. 5, 2019

(54) SYSTEM AND METHOD FOR PREEMPTIVE SELF-HEALING SECURITY

(71) Applicant: Auburn University, Auburn, AL (US)

(72) Inventors: Chwan-Hwa Wu, Auburn, AL (US); J. David Irwin, Auburn, AL (US); Daoqi Hou, Auburn, AL (US)

(73) Assignee: Auburn University, Auburn, AL (US)

( * ) Notice: Subject to any disclaimer, the term of this patent is extended or adjusted under 35 U.S.C. 154(b) by 140 days.

(21) Appl. No.: 15/587,946

(22) Filed: May 5, 2017

(65) Prior Publication Data

US 2017/0324555 A1 Nov. 9, 2017

Related U.S. Application Data

(60) Provisional application No. 62/332,105, filed on May 5, 2016.

(51) Int. Cl.
*H04L 9/08* (2006.01)
*H04L 29/06* (2006.01)
*H04L 9/06* (2006.01)
*H04L 9/32* (2006.01)
*G06F 21/54* (2013.01)

(52) U.S. Cl.
CPC ............ *H04L 9/0819* (2013.01); *G06F 21/54* (2013.01); *H04L 9/0637* (2013.01); *H04L 9/0869* (2013.01); *H04L 9/0891* (2013.01); *H04L 9/0894* (2013.01); *H04L 9/3242* (2013.01); *H04L 63/0428* (2013.01); *H04L 63/1416* (2013.01); *H04L 63/1483* (2013.01); *H04L 2209/80* (2013.01)

(58) Field of Classification Search
CPC ... H04L 9/0819; H04L 9/0637; H04L 9/0869; H04L 9/0891; H04L 9/0894; H04L 9/3242; H04L 63/0428; H04L 63/1416; H04L 63/1483; G06F 21/54
See application file for complete search history.

(56) References Cited

U.S. PATENT DOCUMENTS

| | | | | |
|---|---|---|---|---|
| 6,658,566 B1 * | 12/2003 | Hazard | ................ | G06F 21/78 380/28 |
| 9,954,893 B1 * | 4/2018 | Zhao | ................ | H04L 63/1466 |
| 2010/0103837 A1 * | 4/2010 | Jungck | ............. | H04L 29/12066 370/252 |

* cited by examiner

*Primary Examiner* — Oleg Korsak
(74) *Attorney, Agent, or Firm* — Christopher M. Scherer; DeWitt LLP

(57) ABSTRACT

The present system and method allow for preemptive, self-healing computer security. The system includes a user device processor and a PSS server processor. The two processors perform an initial Data Structure & Key Mutation (DSKM) method and an interval DSKM method at a given interval to protect secret information and prevent its exposure by attackers. When a user requests a site or service that is an attractive target for attackers, such as a bank site or monetary transfer service, the processors perform a Man in the Browser attack prevention method. When a packet is received or generated, the processors perform a Deep Protocol and Stateful Inspection and Prevention method to prevent receipt of malicious packets or the loss of sensitive information. Various forensics modules allow accurate forensic examination of the type, scope, and method of attack, as well as real-time protection of cloud-based services.

28 Claims, 20 Drawing Sheets

Figure 18a

Log Table

| Log ID | URL | Time | Requesting Domain & IP | Delivery Domain & IP | Reference URL | Mouse | Protocol | Ecryption | Previous State | Reference Tab ID |
|---|---|---|---|---|---|---|---|---|---|---|
| 1 | attacker.com/m yimage.php | 2015/7/13/5:01 | attacker.com 10.10.16 | attacker.com 10.10.16 | None | No | HTTP | No | External Source | None |
| 2 | attacker.com/m yimage.php | 2015/7/13/5:01 | attacker.com 10.10.16 | attacker.com 10.10.16 | None | No | HTTP | No | External Source | None |
| 3 | attacker.com/m yimage.php | 2015/7/13/5:02 | attacker.com 10.10.16 | bank.com 10.10.15 | None | No | HTTP | No | CSRF Attack | None |

Figure 18b

State Table

| State Pseudo-ID | Domain Name | Cookie | Actor's Role | Sensitive Information | Adobe Cross-Domain Policy File | Current State | Tab ID |
|---|---|---|---|---|---|---|---|
| PRNG(User PID, Device PID, Tab ID | attacker.com bank.com | None | attacker.com Client bank.com Server | Yes | No | Blocked | 00001 |

SYSTEM AND METHOD FOR PREEMPTIVE SELF-HEALING SECURITY

CROSS-REFERENCE TO RELATED APPLICATION(S)

The present application claims priority of U.S. Provisional Patent Application No. 62/332,105, filed on May 5, 2016, the content of which is incorporated herein by reference in its entirety.

FIELD

The present disclosure is directed to wireless communication networks, and more specifically to security arrangements for access and authorization security and fraud detection.

BACKGROUND

As the world moves further into the mobile information age, the need to securely connect to wireless communication networks, which are the access networks to the Internet infrastructure, is increasing dramatically. More and more customers like to shop online, pay bills, and even manage their bank accounts using free, convenient public Wi-Fi. Public locations, such as stores and airports, make Wi-Fi available for customers and other members of the public as a matter of course.

However, the current wireless media environment is not secure enough for sensitive information such as passwords. An attacker can easily set up Rogue Access Points (APs) to take advantage of public Wi-Fi. Rogue APs are critical threats in the information infrastructure. Once a user's devices connect to Rogue APs, the attacker can exploit the Rogue AP as a bridgehead to launch multiple stage attacks.

For example, the attacker can use Domain Name System Spoofing to redirect a user to some malicious website, and then download malware to that user's device. Such malware can include keyloggers that record the user's keystrokes. Attackers can steal cookies or authentication tokens from a user's browser. Man in the Browser (MitB) attacks can modify an authentic login page to require the user to provide more identifying information, such as a social security number, which is then forwarded to the attacker. Man in the Middle (MitM) attacks can capture sensitive data, such as passwords, in transit. MitM attacks may extend to a wired environment such as wired access networks (e.g., cable modems.)

Traditional defense methods such as signature- and statistics-based intrusion detection and prevention systems are inadequate in defending against Rogue APs. There is an unmet need for a system capable of protecting against Rogue APs and conducting forensic reviews of attempted attacks to strengthen system protection.

SUMMARY

An exemplary embodiment of the present application is a method for preemptive, self-healing computer security. The method performs an initial Data Structure & Key Mutation (DSKM) method, then performs an interval DSKM method at a given interval. The method performs a Man in the Browser (MitB) attack prevention method when a user requests a predetermined site and performs a Deep Protocol and Stateful Inspection and Prevention (DPSI) method when a packet is received or generated.

Another exemplary embodiment of the present application is a method for preemptive, self-healing computer security. In addition to the above-mentioned method, this method performs a forensics method and performs the interval DSKM method if the forensics method declares any secrets compromised.

Another exemplary embodiment of the present application is a system for preemptive, self-healing computer security. The system includes a user device processor and a PSS server processor. The system also includes a non-transient computer readable medium operatively connected to the user device processor and the PSS server processor. This medium is programmed with computer readable code that upon execution by the user device processor and the PSS server processor causes the user device processor and the PSS server processor to execute the above-mentioned method for preemptive, self-healing computer security. The system also includes a relational database stored on a PSS server. The relational database includes a user pseudo-ID (PID) table, a user device PID table, a login table, a state table, and a tab log table.

The objects and advantages will appear more fully from the following detailed description made in conjunction with the accompanying drawings.

BRIEF DESCRIPTION OF THE DRAWING(S)

FIGS. 18a and 18b depict the log table and the state table, respectively, for a sample CSRF attack.

DETAILED DESCRIPTION

In the present description, certain terms have been used for brevity, clearness and understanding. No unnecessary limitations are to be applied therefrom beyond the requirement of the prior art because such terms are used for descriptive purposes only and are intended to be broadly construed. The different systems and methods described herein may be used alone or in combination with other systems and methods. Various equivalents, alternatives and modifications are possible within the scope of the appended claims. Each limitation in the appended claims is intended to invoke interpretation under 35 U.S.C. § 112, sixth paragraph, only if the terms "means for" or "step for" are explicitly recited in the respective limitation.

Figure 1:
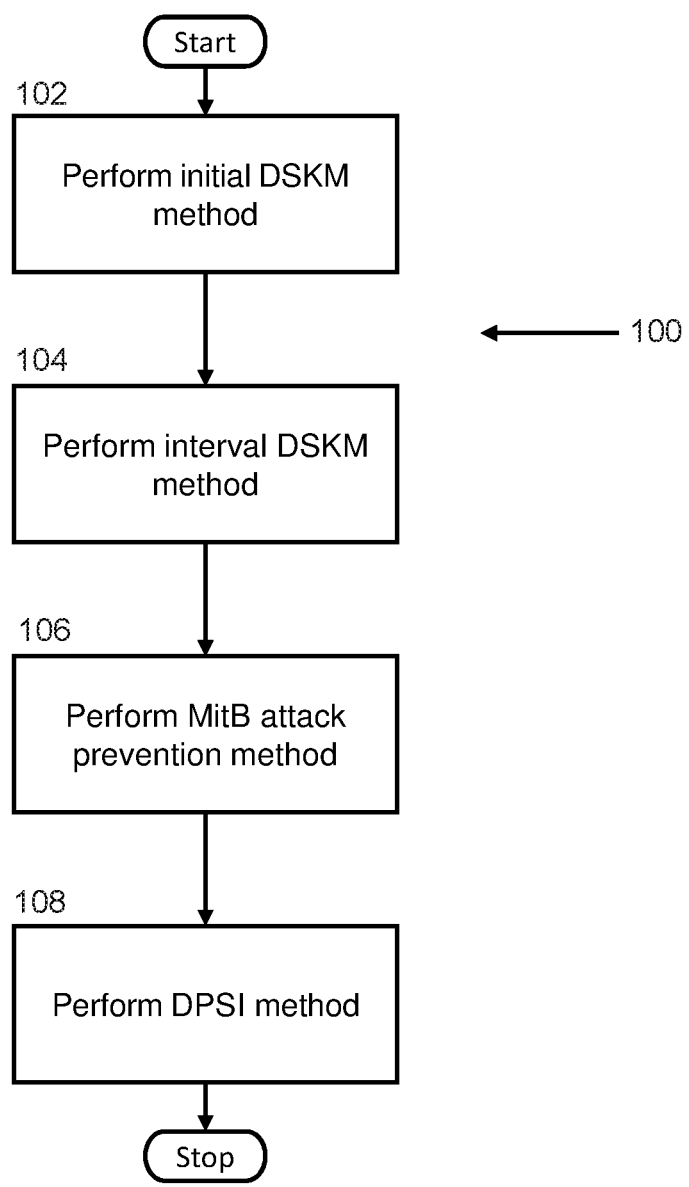
FIG. 1 is a flowchart depicting an exemplary embodiment of a method for preemptive, self-healing computer security.

FIG. 1 is a flowchart depicting an exemplary embodiment of method 100 for preemptive, self-healing computer security.

In step 102, method 100 performs an initial Data Structure & Key Mutation (DSKM) method 200.

The DSKM module cooperates with Handshake process closely, since they are covered by each other. Handshake provides new secrets to Server Table and Device Table; and some new secrets (PIDD) contribute mutation of tables as well. Mutating tables protect secrets involved in Handshake. Mutating tables protects some credentials used to reassemble some mutating secrets ($K_{STD}$). Mutating Secrets can encrypt/decrypt Server Table and Device Table. Handshake provides some credentials to reassemble the mutating secret ($K_{STSD}$). Mutating Secrets encrypt some credentials involved in Handshake.

The Handshake process is the first step to establish secure connection between user's Android device and PSS server. The first time Handshake is called Registration which is little bit different with following Handshakes. The registration process is only required for each new device.

Regarding to foolproof design and best user experience, the Handshake process will be executed automatically for authentication and VPN connection for Wi-Fi after Android device power on, thus there is no extra user interaction required at all. The VPN has two layers of authentication: first one is symmetric One-time Password (OTP) based on the DSKM module, and the second one is PKI certificate mutual authentication.

In step 104, method 100 performs an interval DSKM method 300 at a given interval. The given interval may be a predetermined interval or an interval between a previous instance of performing interval DSKM method 300 and the user logging in. This ensures that not only is interval DSKM method 300 performed every time a user logs in, interval DSKM method 300 is also performed periodically without user login, ensuring that if an attacker somehow manages to penetrate security, they will not be able to exploit the breach for long.

In step 106, method 100 performs a Man in the Browser (MitB) attack prevention method 400. Step 106 is performed when a user requests a predetermined site. This predetermined site is selected from a list of "important" sites, sites for which a security breach can cause significant financial or security hardship, such as banking or account payment sites.

In step 108, method 100 performs a Deep Protocol and Stateful Inspection and Prevention (DPSI) method 500. Step 108 is performed when a packet is received or generated to prevent the receipt of altered or potentially malicious packets, or to prevent the transmission of secret information.

Figure 2:
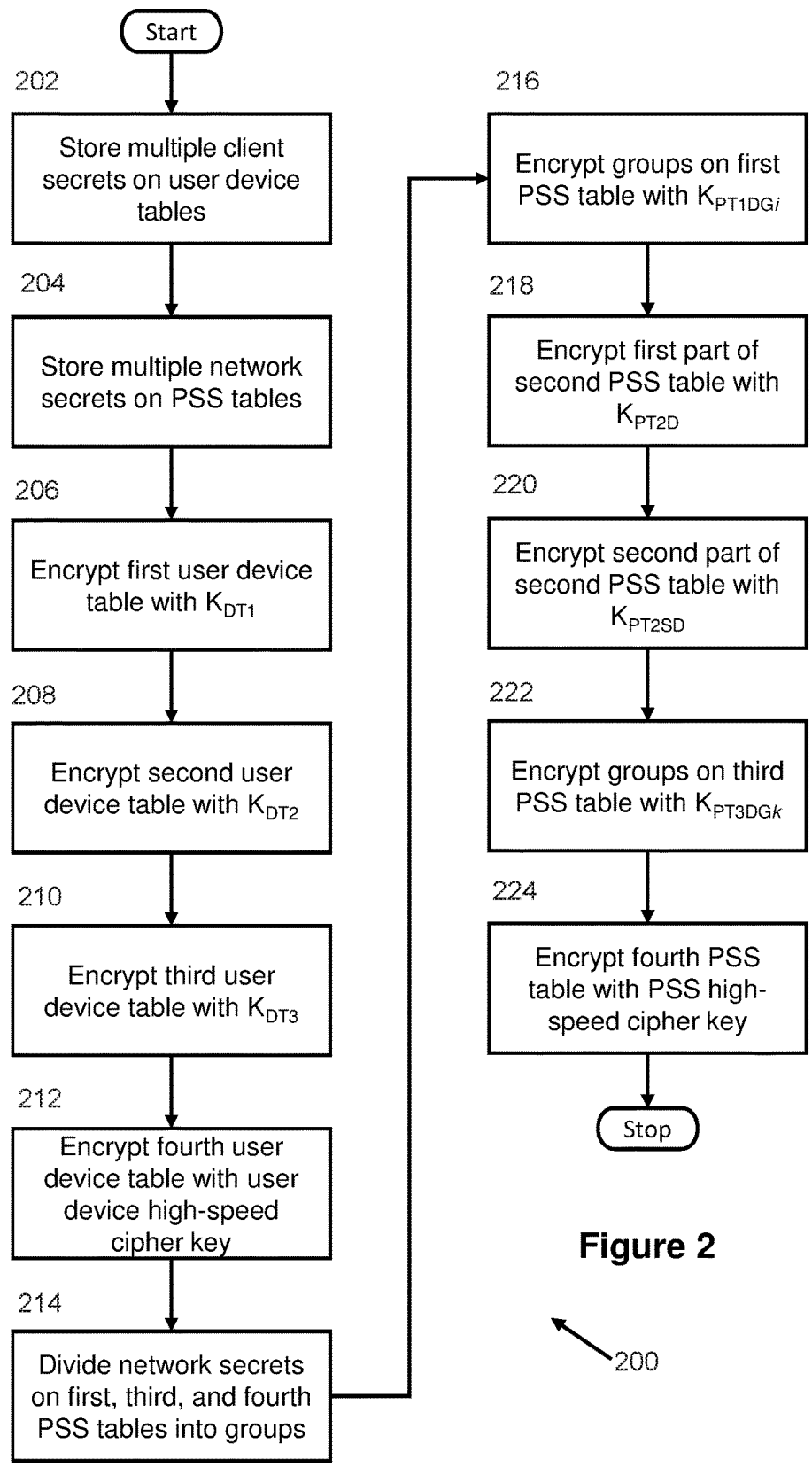
FIG. 2 is a flowchart depicting an exemplary embodiment of a method for initial Data Structure & Key Mutation (DSKM).

FIG. 2 is a flowchart depicting an exemplary embodiment of method 200 for initial Data Structure & Key Mutation (DSKM). DSKM constantly mutates not only the data structures (tables), but also the keys used to encrypt the tables. In this way, DSKM method 200 provides extremely security storage for critical secrets, regardless of whether any partial table or single device is compromised. Mutual support of different tables allows identification of lost or stolen credentials. Separation of authentication secrets in multiple tables also allows different strategies for protection of different tables.

In step 202, method 200 stores multiple client secrets on at least one of a plurality of user device tables. The user device tables include at least a first user device table, a second user device table, a third user device table, and a fourth user device table.

In the exemplary embodiment, the first user device table stores a user PID, a user device pseudo-ID (PID), a PSS server PID, a user ID, a user device ID, a user device salt, a server pseudo-random number string, a login trial number, a user device DoS secret, and a PSS server DoS secret. The user PID is a 256-bit string generated for the user every session. The user device PID is a 256-bit string generated for the user device every session. The PSS server PID is a 256-bit string generated in the PSS server for each user device every session. The user ID is a unique 64-bit string generated for the user during registration. The user device ID is a unique 64-bit string generated for the user device during registration. The user device salt is a 256-bit random string generated for the user device during registration. The server pseudo-random number string is generated from a server salt. The login trial number is a 32-bit string started from a nonce and increased by 1 after each login. The user device denial-of-service (DoS) secret is generated by the user device to provide distributed denial-of-service (DDoS) prevention for the PSS server and is updated every session. The PSS server DoS secret is generated by the PSS server to provide DDoS prevention for the user device and is updated every session.

In the exemplary embodiment, the second user device table stores a user device next session key, a PSS server next session key, a user device nonce, a key seed for the user device, a user device index, a session number, a user secret, a user device authenticator, and a secondary PSS server authenticator. The user device next session key is generated by the user device and used to encrypt some variable in the packet for session login. The PSS server next session key is generated by the PSS server and used to encrypt some variable in the packet for session login. The user device nonce is generated by the user device and updated every session. The key seed for the user device is used to generate the user device next session key and updated every session. The user device index is a searching key of the third PSS server table, generated by the user device and updated every session. The session number is a 64-bit string, started from a nonce and increased by 1 after each session login. The user secret is a 256-bit string generated by the user device during registration. The user device authenticator is generated by the user device and used to authenticate the user device. The secondary PSS server authenticator is generated by the PSS server from a PSS server authenticator, sent to the user device, and used to authenticate the PSS server.

In the exemplary embodiment, the third user device table stores the cookie PID and an encrypted cookie. The cookie PID is a 256-bit string generated in the PSS server for each cookie. The cookie PID is a pseudo-random number generated from the domain name of the URL, the cookie name, and the cookie nonce.

In the exemplary embodiment, the fourth user device table stores a state PID, a domain name, a cookie, an actor's role, whether the packet contains sensitive information, whether there is an Adobe cross-domain policy file, the current state, the tab ID, and the cookie PID. The state PID is generated by the user PID, the user device PID, and the tab ID. The domain name includes the requesting domain name and the destination domain name. The cookie includes a cookie name and a cookie nonce, a random string generated by the user device for each cookie and used to retrieve the cookie from the third user device table. The actor's role includes the domain name of the URL entered on the user device, and presents the current website's role in the communication such as relying party, identity provider, client, and server. The type of sensitive information present can include, but is not limited to, password, financial, transactional, or identifying information. The current state is the current state of the corresponding session. The tab ID is the hash index of the log table.

In step 204, method 200 stores multiple network secrets on at least one of a plurality of PSS tables. The PSS tables include at least a first PSS table, a second PSS table, a third PSS table, and a fourth PSS table.

In the exemplary embodiment, the first PSS server table stores the PSS server PID, a PSS server ID, the user PID, the user device PID, a PSS server salt, a device pseudo-random number string, a PSS server nonce, a key seed, the login trial number, a user device DoS secret, a PSS server DoS secret, and a server device index. The PSS server ID is a unique 64-bit string generated for the PSS server during establishment. The PSS server salt is a 256-bit random string, generated for the PSS server during registration. The device pseudo-random number string is generated from a user device salt. The PSS server nonce is generated by the PSS server and updated every session. The key seed for the PSS server is generated by the PSS server and updated every session. The server device index is a searching key of the second PSS server table, generated by the PSS server and updated every session.

In the exemplary embodiment, the second PSS server table stores the server device index, a PSS secret for the user device, the user device next session key, a map for $K_{PT3DG}$, and the user ID. The server secret for the user device is a 256-bit string generated by the PSS server for the user device during registration. The map for $K_{PT3DG}$ contains the pointers to each piece of encrypted $K_{PT3DG}$ and is updated every session.

In the exemplary embodiment, the third PSS server table stores the user device index, the session number, the secondary user device authenticator, and the PSS server authenticator. The secondary user device authenticator is generated by the user device from the user device authenticator, sent to the PSS server, and used to authenticate the user device. The PSS server authenticator is generated by the PSS server and used to authenticate the PSS server. In the exemplary embodiment, the fourth PSS server table stores the same information as the fourth user device table.

In step 206, method 200 encrypts the first user device table with a first device table Advanced Encryption Standard Galois/Counter Mode (AES-GCM) key $K_{DT1}$.

In step 208, method 200 encrypts the second user device table with a second device table AES-GCM key $K_{DT2}$.

In step 210, method 200 encrypts the third user device table with a third device table AES-GCM key $K_{DT3}$.

In step 212, method 200 encrypts the fourth user device table with a user device high-speed cipher key. In the certain embodiments, the user device high-speed cipher key is a ChaCha key. In the exemplary embodiment, the user device high-speed cipher key is a self-evolving ChaCha key, i.e. a ChaCha key generated using a previously generated ChaCha key.

In step 214, method 200 divides network secrets on the first PSS table, the third PSS table, and the fourth PSS table into multiple groups in each table based on at least one secret stored in the PSS tables. By way of non-limiting example, such a secret may be the user PID.

In step 216, method 200 encrypts the i groups in the first PSS table with 1-i first PSS table AES-GCM keys $K_{PT1DGi}$. Each $K_{PT1DGi}$ encrypts one group in the first PSS table. In certain embodiments, each AES-GCM key for each group in each table is encrypted by a two-layer high-speed cipher key, wherein each layer of the two-layer high-speed cipher key alternately updates. In the certain embodiments, the two-layer high-speed cipher key is a ChaCha key.

In step 218, method 200 encrypts the first part of the second PSS table with a first partial second PSS table AES-GCM key $K_{PT2D}$. In the exemplary embodiment, the first part of the second PSS server table includes the PSS secret for the user device and the user ID.

In step 220, method 200 encrypts the second part of the second PSS table with a second partial second PSS table AES-GCM key $K_{PT2SD}$. In the exemplary embodiment, the second part of the second PSS server table includes the user device next session key and the map for $K_{PT3DG}$.

In step 222, method 200 encrypts the k groups in the third PSS table with 1-k third PSS table AES-GCM keys $K_{PT3DGk}$. Each $K_{PT3DGk}$ encrypts one group in the first PSS table.

In step 224, method 200 encrypts the fourth PSS table with a PSS high-speed cipher key. In the certain embodiments, the PSS high-speed cipher key is a ChaCha key. In the exemplary embodiment, the PSS high-speed cipher key is a self-evolving ChaCha key.

Figure 3:
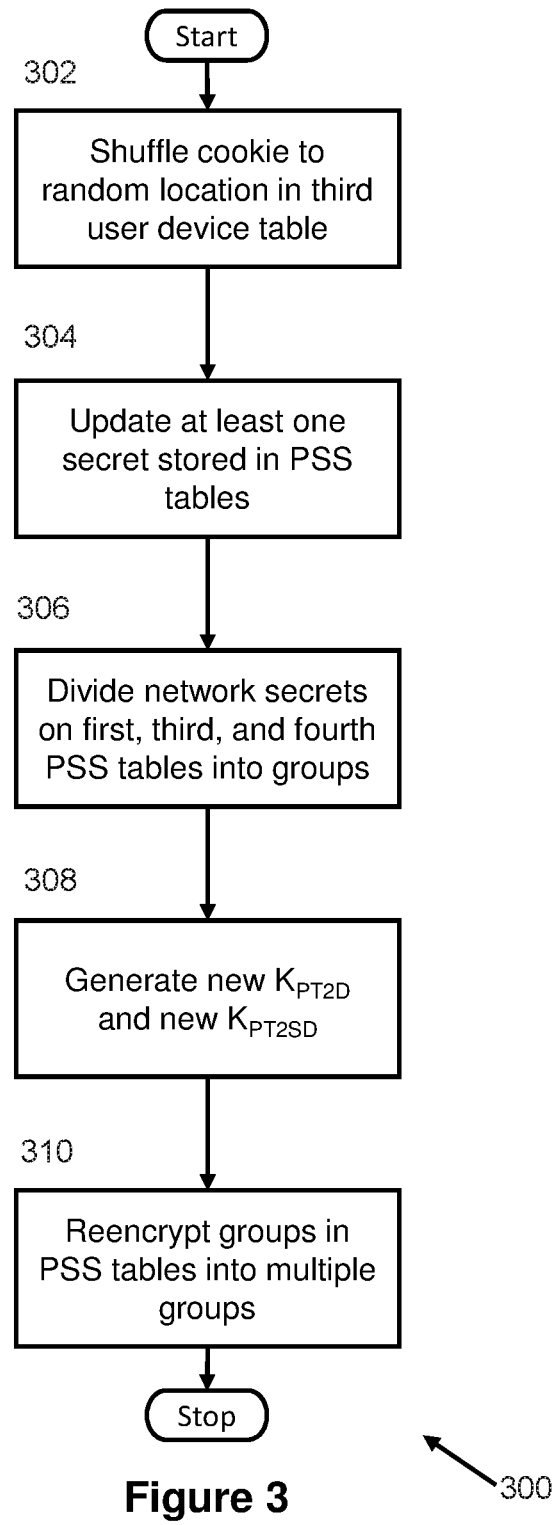
FIG. 3 is a flowchart depicting an exemplary embodiment of a method for interval DSKM.

FIG. 3 is a flowchart depicting an exemplary embodiment of method 300 for interval DSKM. Interval DSKM method 300 varies from initial DSKM method 200 in that method 300 is performed periodically without user login, through a simulated login. This simulated login causes a mutation of the tables and keys at periodic intervals, ensuring that if an attacker somehow manages to penetrate security, they will not be able to exploit the breach for long. If a forensics method discovers any compromised secrets, performing interval DSKM method 300 will alter multiple secrets and change the locations of certain secrets, healing the breach and preventing an attacker from exploiting the compromised secret for long.

In step 302, method 300 shuffles at least one cookie to a random location in the third user device table.

In step 304, method 300 updates the at least one secret stored in the PSS tables.

In step 306, method 300 divides the network secrets on the first PSS table, the third PSS table, and the fourth PSS table into multiple groups in each table based on the user PID currently in the first PSS table. The groups and positions within groups that secrets are assigned to may be different from those assigned in step 214 of method 200.

In step 308, method 300 generates a new $K_{PT2D}$, and a new $K_{PT2SD}$.

In step 310, method 300 reencrypts the i groups in the first PSS table with the 1-i $K_{PT1DGi}$, reencrypts the first part of the second PSS table with the new $K_{PT2D}$, reencrypts the second part of the second PSS table with the new $K_{PT2SD}$, and reencrypts the k groups in the third PSS table with the 1-k $K_{PT3DGk}$.

Figure 4:
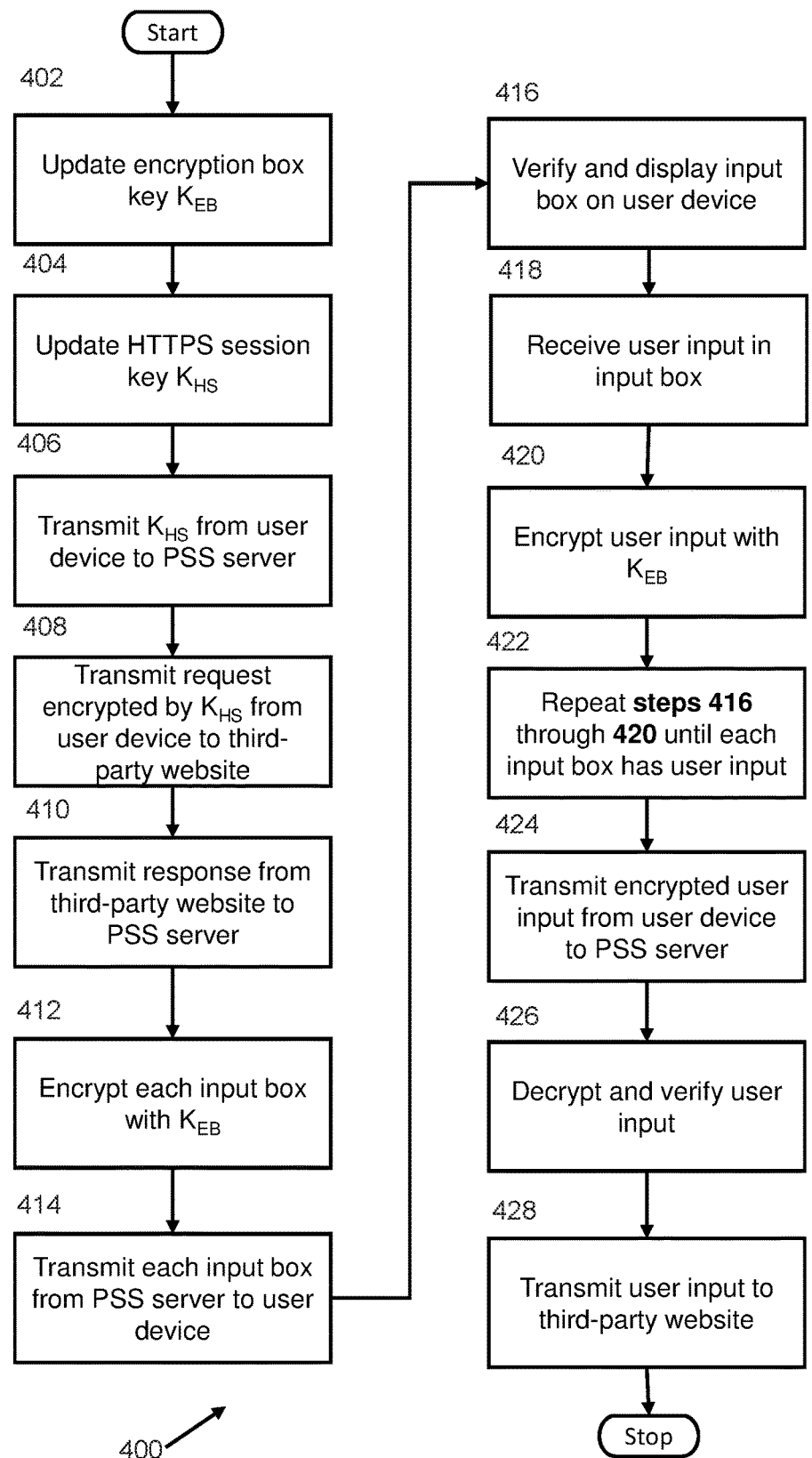
FIG. 4 is a flowchart depicting an exemplary embodiment of a method for Man in the Browser (MitB) attack prevention.

FIG. 4 is a flowchart depicting an exemplary embodiment of method 400 for Man in the Browser (MitB) attack prevention.

In step 402, method 400 updates an encryption box key $K_{EB}$.

In step 404, method 400 updates a Hyper Text Transfer Protocol Secure (HTTPS) session key $K_{HS}$.

In step 406, method 400 transmits the $K_{HS}$ from a user device to a PSS server.

In step 408, method 400 transmits a request encrypted by the $K_{HS}$ from the user device to a third-party website.

In step 410, method 400 transmits a response including multiple input boxes from the third-party website to the PSS server.

In step 412, method 400 encrypts each of the input boxes with the $K_{EB}$.

In step 414, method 400 transmits each of the input boxes from the PSS server to the user device.

In step 416, method 400 verifies and displays one of the input boxes on the user device.

In step 418, method 400 receives user input in one of the input boxes.

In step 420, method 400 encrypts the user input with the $K_{EB}$.

In step 422, method 400 repeats steps 416 through 420 until each of the plurality of input boxes has received user input.

In step 424, method 400 transmits the encrypted user input from the user device to the PSS server.

In step 426, method 400 decrypts and verifies the user input.

In step 428, method 400 transmits the user input to the third-party website.

Figure 5:
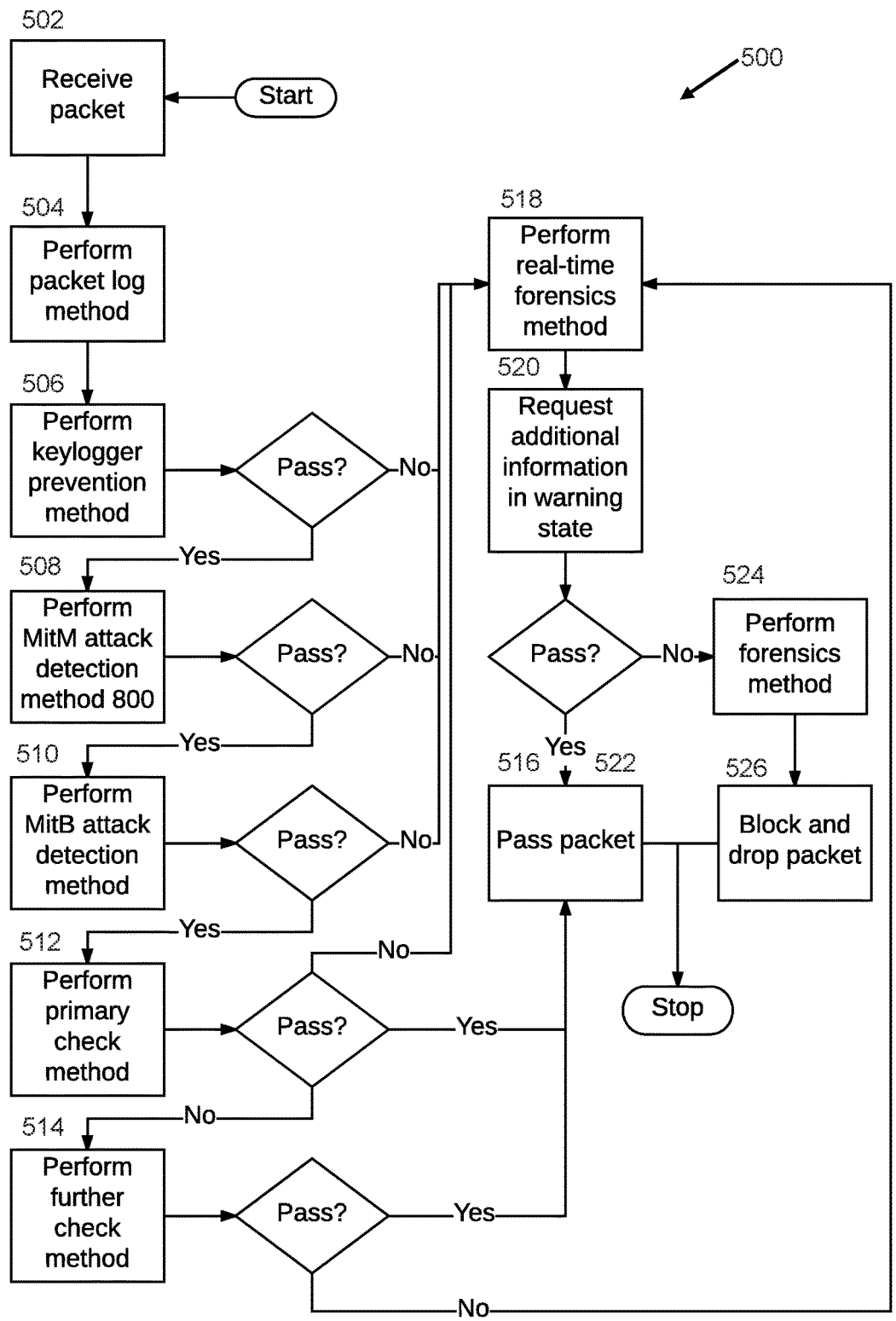
FIG. 5 is a flowchart depicting an exemplary embodiment of a method for Deep Protocol and Stateful Inspection and Prevention (DPSI).

FIG. 5 is a flowchart depicting an exemplary embodiment of method 500 for DPSI.

In step 502, method 500 receives the packet.

In step 504, method 500 performs packet log method 600.

In step 506, method 500 performs keylogger prevention method 700.

In step 508, method 500 performs MitM attack detection method 800 if the packet passes the keylogger prevention method 700 in step 506.

In step 510, method 500 performs MitB attack detection method 900 if the packet passes the MitM attack detection method 800 in step 508.

In step 512, method 500 performs primary check method 1000 if the packet passes the MitB attack detection method 900 in step 510.

In optional step 514, method 500 performs further check method 1100 if the packet does not pass primary check method 1000 in step 512.

In optional step 516, method 500 passes the packet if the packet passes methods 700, 800, 900, and 1000.

In optional step 518, method 500 performs real-time forensics method 1700 and enters a warning state if the packet does not pass even one of methods 700, 800, 900, or 1000.

In optional step 520, method 500 requests additional information in the warning state.

In optional step 522, method 500 passes the packet if the packet passes the warning state.

In optional step 524, method 500 performs a forensics method (keylogger forensics method 1200, cookie forensics method 1350, memory scraping forensics 1600, or real-time forensics 1700) if the packet does not pass the warning state.

In optional step 526, method 500 blocks and drops the packet.

Figure 6:
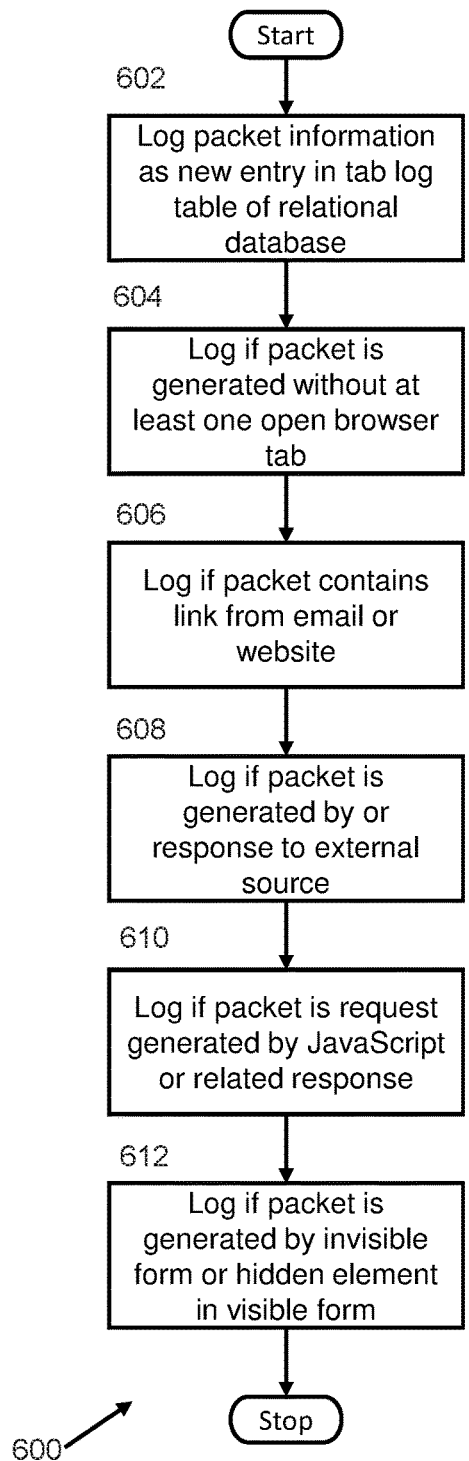
FIG. 6 is a flowchart depicting an exemplary embodiment of a method for logging a state.

FIG. 6 is a flowchart depicting an exemplary embodiment of method 600 for logging a packet.

In step 602, method 600 logs the packet information as a new entry in a tab log table of a relational database.

In optional step 604, method 600 logs if the packet is generated without at least one open browser tab.

In optional step 606, method 600 logs if the packet contains a link from an email or a website.

In optional step 608, method 600 logs if the packet is generated by or a response to an external source. External sources may include, but are not limited to, an iframe or an image.

In optional step 610, method 600 logs if the packet is a request generated by a JavaScript or a related response.

In optional step 612, method 600 logs if the packet is generated by an invisible form or a hidden element in a visible form.

Figure 7A:
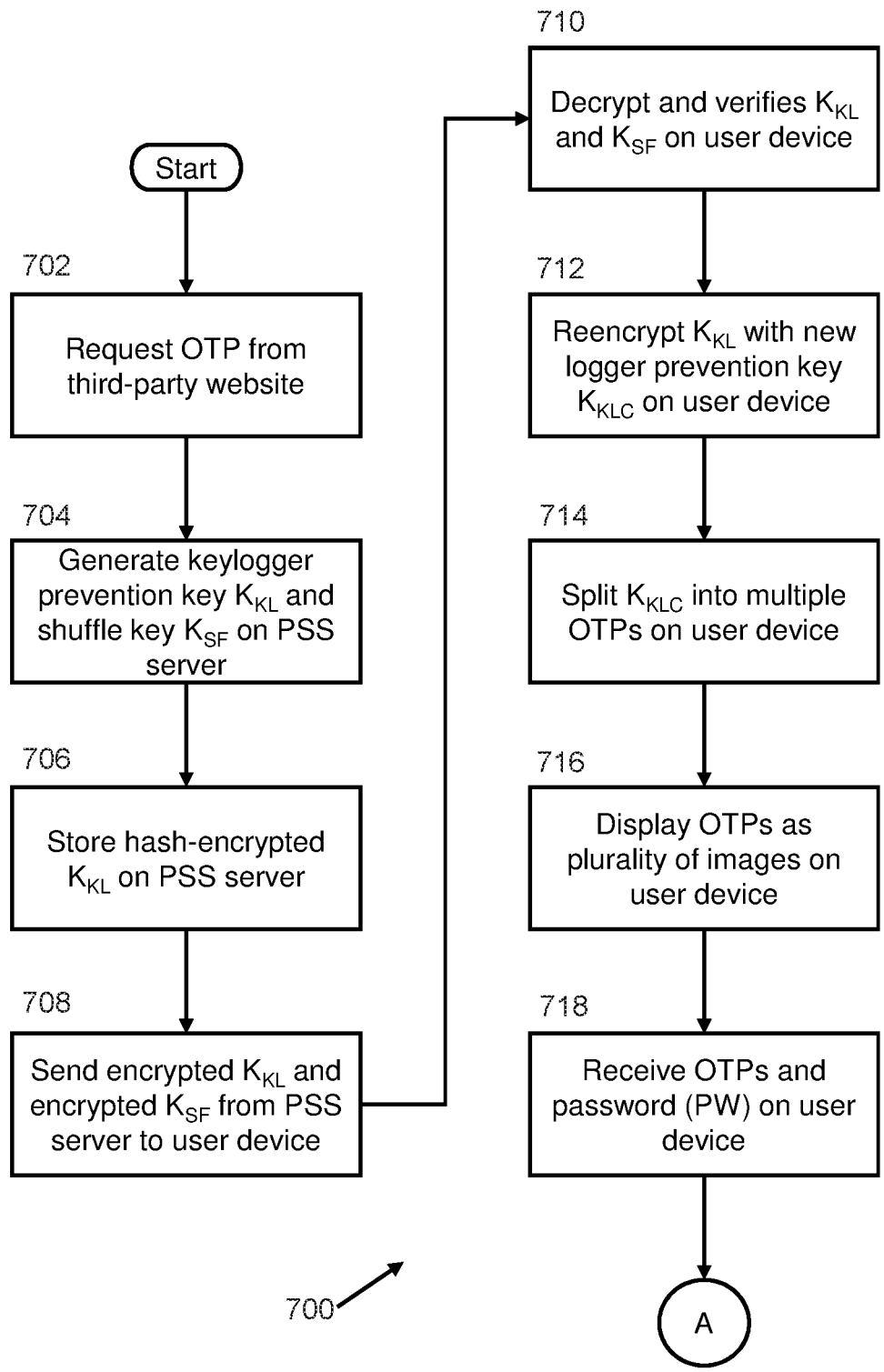
FIGS. 7a and 7b are a flowchart depicting an exemplary embodiment of a method for keylogger prevention.
Figure 7B:
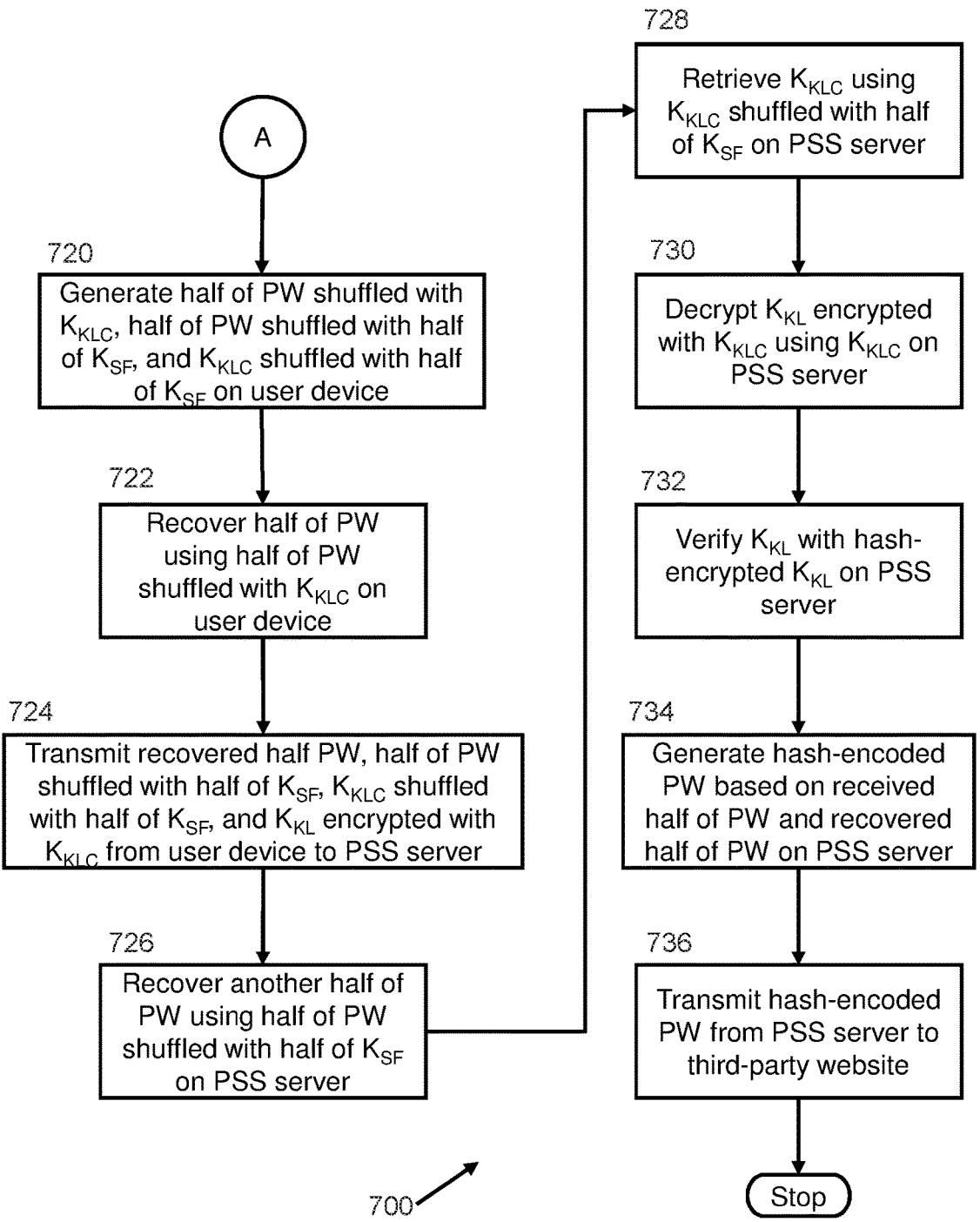

FIGS. 7a and 7b are a flowchart depicting an exemplary embodiment of method 700 for keylogger prevention. Method 700 describes the backend procedure executed by a processor in a system. From the frontend, that is, a user's perspective, once a user moves their cursor to a protected input box displayed on the user device and inputs part of their password, the user device shows part of the one-time password (OTP) as an image for a limited time. The user inputs the visible portion of the OTP and begins to enter their password again. The user device continues to show parts of the OTP and require their input until the user has entered the entire OTP and their password. The OTP is shown as image and only displays for a few seconds for security. In this way, even if malware on the user device can take screenshots, it is extremely hard to capture all parts of the OTP, since the timing of OTP part appearances is random and only lasts for a brief time.

In step 702, method 700 requests a OTP from a third-party website.

In step 704, method 700 generates a keylogger prevention key $K_{KL}$ and a shuffle key $K_{SF}$ on a PSS server.

In step 706, method 700 stores a hash-encrypted $K_{KL}$ on the PSS server.

In step 708, method 700 sends an encrypted $K_{KL}$ and an encrypted $K_{SF}$ from the PSS server to the user device.

In step 710, method 700 decrypts and verifies the $K_{KL}$ and the $K_{SF}$ on the user device.

In step 712, method 700 reencrypts the $K_{KL}$ with a new logger prevention key the $K_{KLC}$ on the user device.

In step 714, method 700 splits the $K_{KLC}$ into a plurality of OTPs on the user device.

In step 716, method 700 displays the plurality of OTPs as a plurality of images on the user device.

In step 718, method 700 receives the plurality of OTPs and a password (PW) on the user device.

In step 720, method 700 generates a half of the PW shuffled with the $K_{KLC}$, a half of the PW shuffled with half of the $K_{SF}$, and the $K_{KLC}$ shuffled with half of the $K_{SF}$ on the user device.

In step 722, method 700 recovers half of the PW using the half of the PW shuffled with the $K_{KLC}$ on the user device.

In step 724, method 700 transmits the recovered half PW, the half of the PW shuffled with half of the $K_{SF}$, the $K_{KLC}$ shuffled with half of the $K_{SF}$, and the $K_{KL}$ encrypted with the $K_{KLC}$ from the user device to the PSS server.

In step 726, method 700 recovers another half of the PW using the half of the PW shuffled with half of the $K_{SF}$ on the PSS server.

In step 728, method 700 retrieves the $K_{KLC}$ using the $K_{KLC}$ shuffled with half of the $K_{SF}$ on the PSS server.

In step 730, method 700 decrypts the $K_{KL}$ encrypted with the $K_{KLC}$ using the $K_{KLC}$ on the PSS server.

In step 732, method 700 verifies the $K_{KL}$ with the hash-encrypted $K_{KL}$ on the PSS server.

In step 734, method 700 generates a hash-encoded PW based on the received half of the PW and the recovered half of the PW on the PSS server.

In step 736, method 700 transmits the hash-encoded PW from the PSS server to the third-party website.

Figure 8:
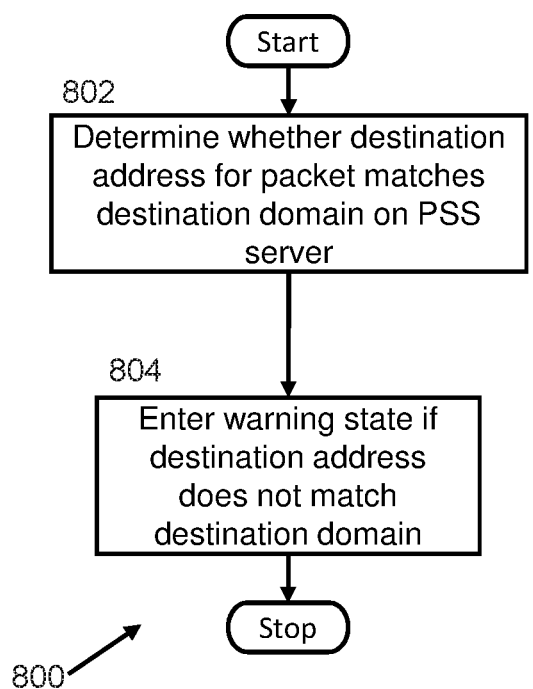
FIG. 8 is a flowchart depicting an exemplary embodiment of a method for MitM attack detection.

FIG. 8 is a flowchart depicting an exemplary embodiment of method 800 for MitM attack detection.

In step 802, method 800 determines whether a destination address for a packet matches a destination domain on a PSS server.

In optional step 804, method 800 enters a warning state if the destination address does not match the destination domain.

Figure 9:
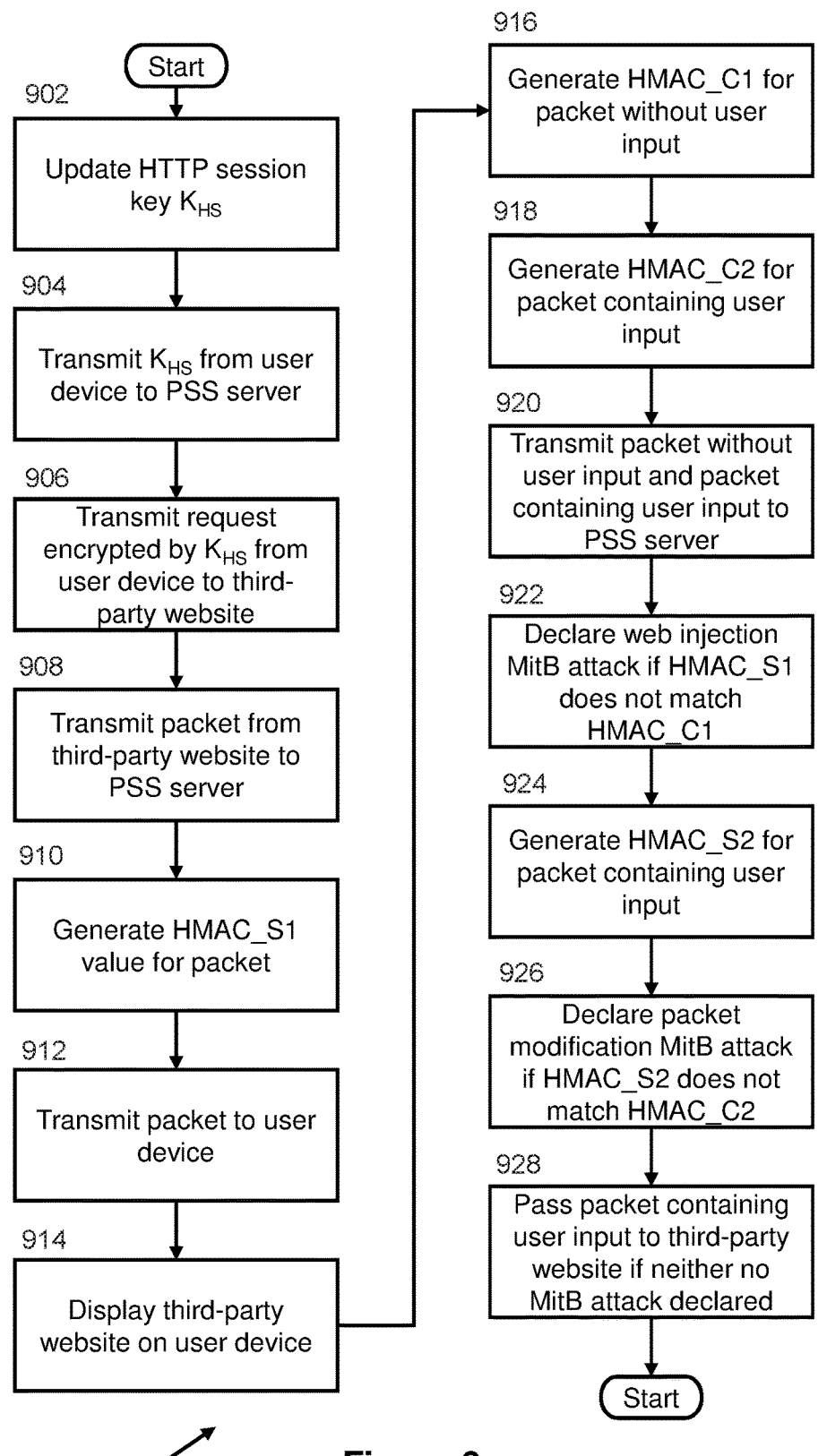
FIG. 9 is a flowchart depicting an exemplary embodiment of a method for MitB attack detection.

FIG. 9 is a flowchart depicting an exemplary embodiment of method 900 for MitB attack detection.

In step 902, method 900 updates a HTTP session key $K_{HS}$.

In step 904, method 900 transmits the $K_{HS}$ from a user device to a PSS server.

In step 906, method 900 transmits a request encrypted by the $K_{HS}$ from a user device to a third-party website.

In step 908, method 900 transmits a packet from the third-party website to the PSS server.

In step 910, method 900 generates a first server keyed-hash message authentication code HMAC_S1 value for the packet.

In step 912, method 900 transmits the packet to the user device.

In step 914, method 900 displays the third-party website on the user device.

In step 916, method 900 generates a first client keyed-hash message authentication code HMAC_C1 for a packet without user input.

In step 918, method 900 generates a second client keyed-hash message authentication code HMAC_C2 for a packet containing user input.

In step 920, method 900 transmits the packet without user input and the packet containing user input to the PSS server.

In optional step 922, method 900 compares the HMAC_S1 to the HMAC_C1 and declares a web injection MitB attack if the HMAC_S1 does not match the HMAC_C1. As used in the present application, "declare" refers to the generation of an alert, the update of a state, the making of a record, or the providing of some other notification of an attack or compromise. Such alerts, updates, records, and notifications may be recorded or transmitted to the user, an administrator, or another third-party.

In step 924, method 900 generates a second server keyed-hash message authentication code HMAC_S2 for the packet containing user input.

In optional step 926, method 900 compares the HMAC_S2 to the HMAC_C2 and declares a packet modification MitB attack if the HMAC_S2 does not match the HMAC_C2.

In optional step 928, method 900 passes the packet containing user input to the third-party website if neither a web injection MitB attack nor a packet modification MitB attack are declared.

Figure 10:
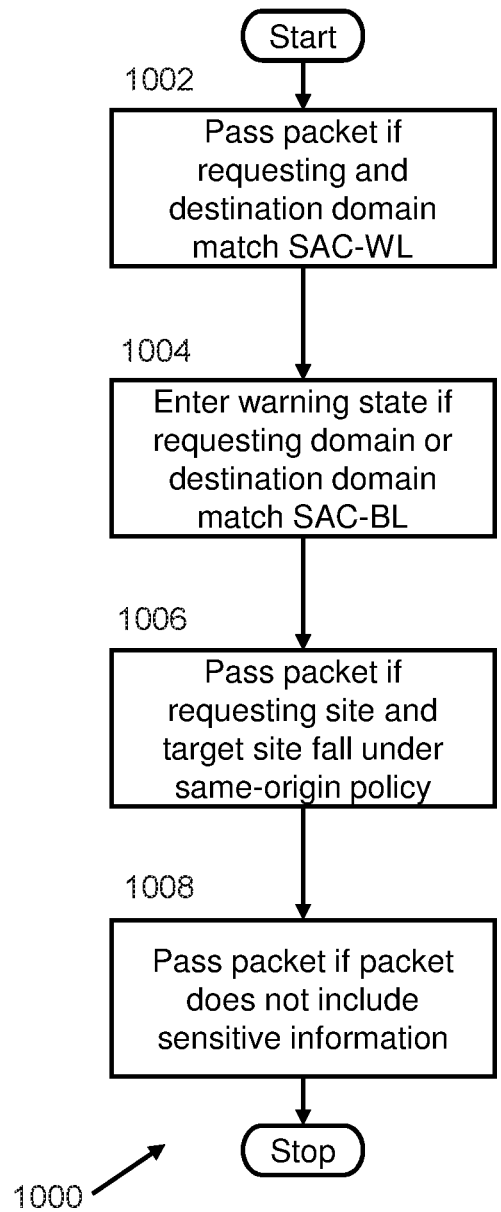
FIG. 10 is a flowchart depicting an exemplary embodiment of a method for primary checking of a packet.

FIG. 10 is a flowchart depicting an exemplary embodiment of method 1000 for primary checking of a packet. Method 1000 utilizes a relational database stored on the PSS server to efficiently access a state table and log relevant information extracted from packet header and content, thereby recording the state of each communication with a given URL.

In optional step 1002, method 1000 passes the packet if the requesting and destination domain match a session access control white list (SAC-WL). Domains on the SAC-WL are approved pairs of requesting and destination domains and may automatically bypass certain security and/or detection steps. The SACL-WL may include the requesting domain name, the destination domain name, the protocol, the port, the IP address, and a SACL-WL duration detailing how long the entry of the SACL-WL may last.

In optional step 1004, method 1000 enters a warning state if the requesting domain or destination domain match a session access control black list (SAC-BL). Domains on the SAC-BL are domains linked to known attacks or attackers and may be intercepted and/or blocked automatically by the PSS server. The SACL-BL may include the domain name, the protocol, the port, and the IP address.

In optional step 1006, method 1000 passes the packet if the requesting site and target site fall under the same-origin policy.

In optional step 1008, method 1000 passes the packet if the packet does not include sensitive information. Sensitive information may include, but is not limited to, password, financial, transactional, or identifying information.

Figure 11:
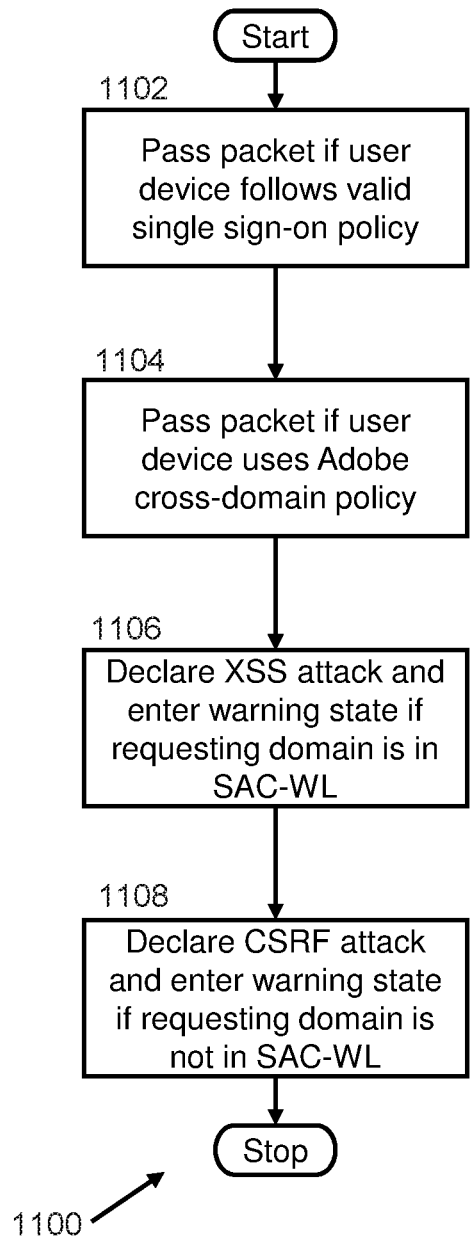
FIG. 11 is a flowchart depicting an exemplary embodiment of a method for further checking of a packet.

FIG. 11 is a flowchart depicting an exemplary embodiment of method 1100 for further checking of a packet.

In optional step 1102, method 1100 passes the packet if user device follows a valid single sign-on policy.

In optional step 1104, method 1100 passes the packet if user device uses an Adobe cross-domain policy.

In optional step 1106, method 1100 declares a cross-site scripting (XSS) attack and enters a warning state if the requesting domain is in a session access control white list.

In optional step 1108, method 1100 declares a cross-site request forgery (CSRF) attack and enters a warning state if the requesting domain is not in a session access control white list.

Figure 12:
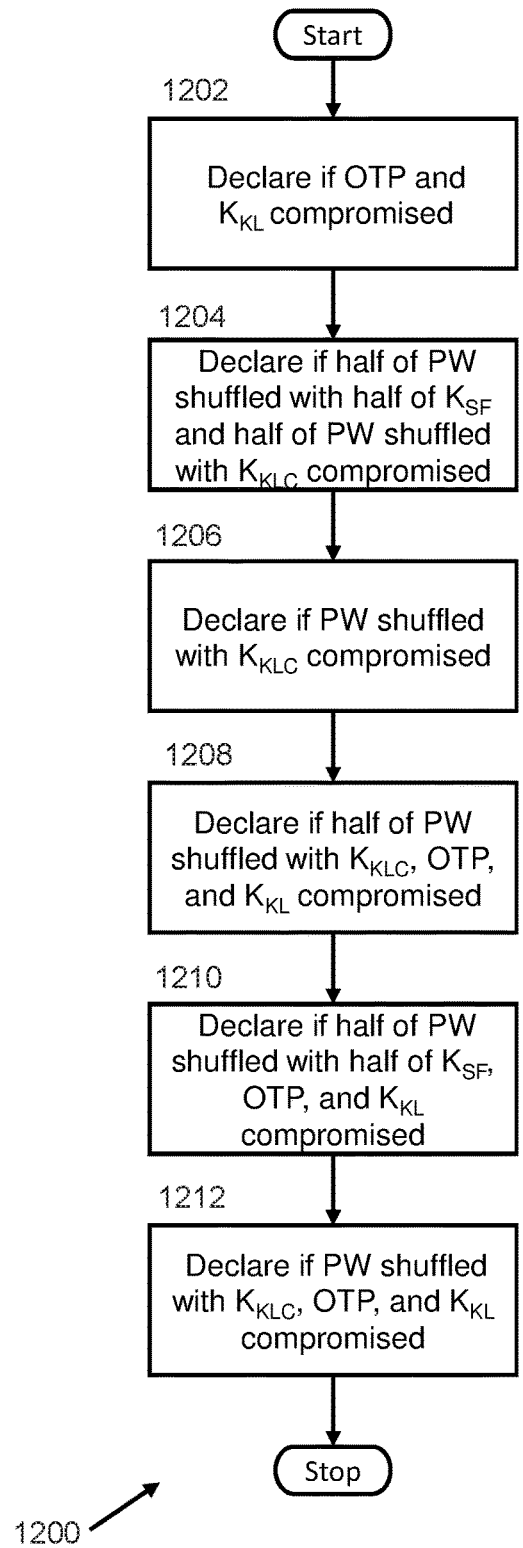
FIG. 12 is a flowchart depicting an exemplary embodiment of a method for keylogger forensics.

FIG. 12 is a flowchart depicting an exemplary embodiment of a method for keylogger forensics.

In optional step 1202, method 1200 declares that a OTP and a $K_{KL}$ are compromised if $K_{KL}$ verification in a PSS server is correct and decryption of a half of the hash-encoded PW in a user device is incorrect.

In optional step 1204, method 1200 declares that a half of a PW shuffled with a half of the $K_{SF}$ and a half of the PW shuffled with the $K_{KLC}$ are compromised if $K_{KL}$ verification in the PSS server is incorrect and decryption of the half of the hash-encoded PW in a user device is correct.

In optional step 1206, method 1200 declares that the PW shuffled with the $K_{KLC}$ is compromised if $K_{KL}$ verification in the PSS server and decryption of the half of the hash-encoded PW in the PSS server and the user device are all incorrect.

In optional step 1208, method 1200 declares that the half of the PW shuffled with the $K_{KLC}$, the OTP, and the $K_{KL}$ are compromised if $K_{KL}$ verification in the PSS server and decryption of the half of the hash-encoded PW in the user device are both correct and decryption of the half of the hash-encoded PW in the PSS server is incorrect.

In optional step 1210, method 1200 declares that the half of the PW shuffled with the half of the $K_{SF}$, the OTP, and the $K_{KL}$ are compromised if $K_{KL}$ verification in the PSS server and decryption of the half of the hash-encoded PW in the PSS server are both correct and decryption of the half of the hash-encoded PW in the user device is incorrect.

In optional step 1212, method 1200 declares that the PW shuffled with the $K_{KLC}$, the OTP, and the $K_{KL}$ are compromised if decryption of the half of the hash-encoded PW in the PSS server and the user device are both incorrect, but $K_{KL}$ verification in the PSS server is correct.

Figure 13A:
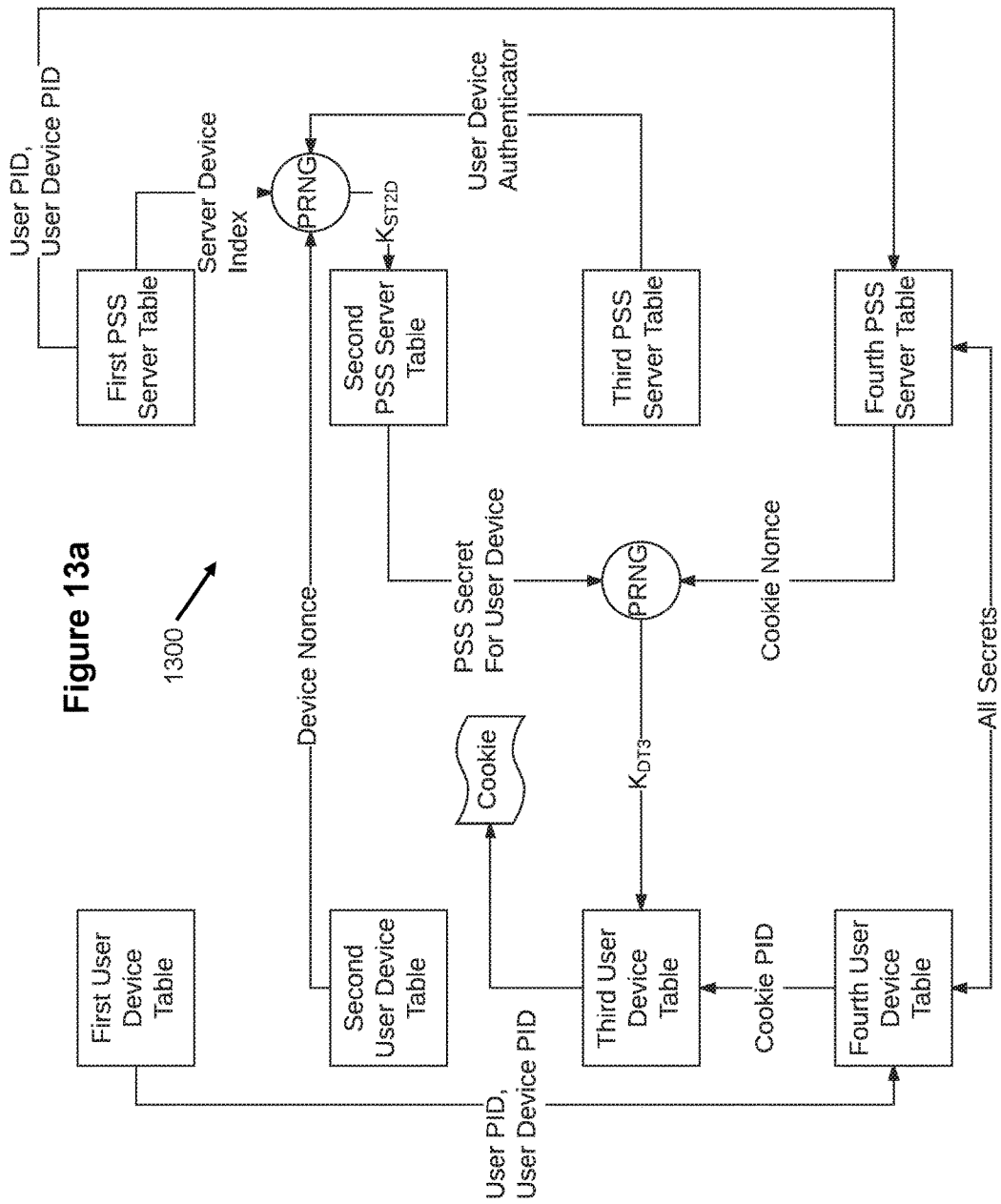
FIG. 13a is a system flowchart depicting the movement of information during an exemplary embodiment of a method for retrieving a cookie.

FIG. 13a is a system flowchart depicting the movement of information during an exemplary embodiment of method 1300 for retrieving a cookie. Certain embodiments require interaction between multiple tables or secrets in order to retrieve other secrets. For example, retrieving a cookie from the third user device table requires secrets from all other user device tables and PSS server tables, as shown in FIG. 13a. Some of these secrets are input for pseudo-random number generators (PRNG), with the PRNG output being used to retrieve secrets from other tables.

Figure 13B:
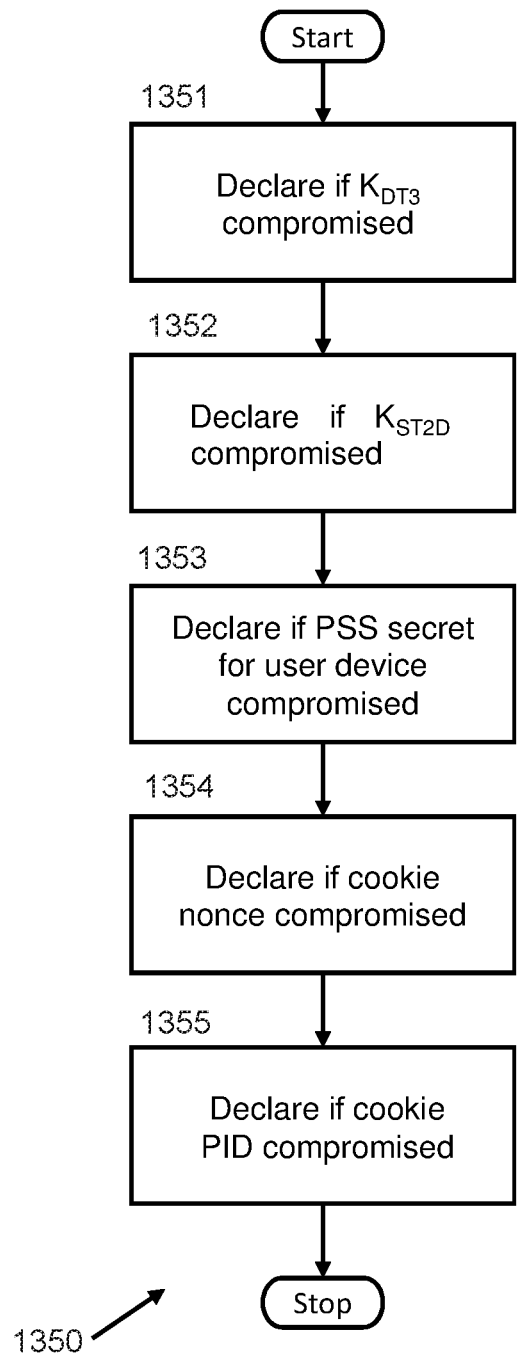
FIG. 13b is a flowchart depicting an exemplary embodiment of a method for cookie forensics.

If steps of the method are bypassed during cookie retrieval, this may indicate that secrets are compromised. FIG. 13b is a flowchart depicting an exemplary embodiment of method 1350 for cookie forensics.

In step 1351, method 1350 declares that the $K_{DT3}$ is compromised if all steps on the PSS server side requiring the PSS server tables are bypassed.

In step 1352, method 1350 declares that the $K_{ST2D}$ is compromised if the user device nonce is not retrieved from the second user device table, the secondary user device authenticator is not retrieved from the third PSS server table, and the server device index is not retrieved from the first PSS server table.

In step 1353, method 1350 declares that the PSS secret for the user device is compromised if the user device nonce is not retrieved from the second user device table, the secondary user device authenticator is not retrieved from the third PSS server table, the server device index is not retrieved from the first PSS server table, and the PSS secret for the user device is not retrieved from the second PSS server table.

In step 1354, method 1350 declares that the cookie nonce is compromised if the user PID and user device PID are not retrieved from the first PSS server table.

In step 1355, method 1350 declares that the cookie PID is compromised if the user PID and the user device PID are not retrieved from the first user device table.

Figure 14:
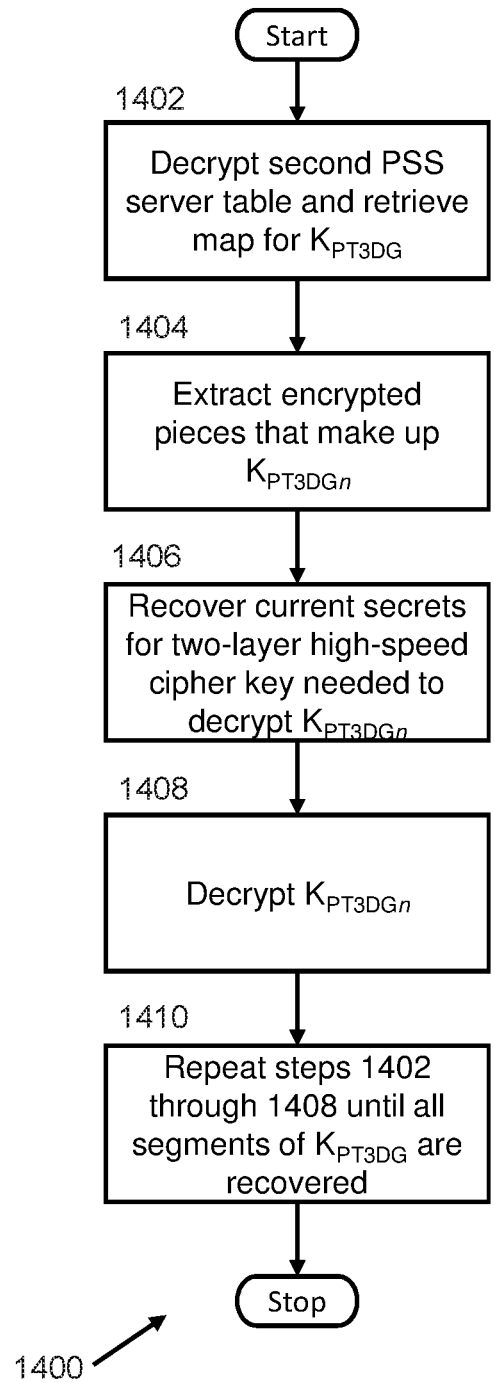
FIG. 14 is a flowchart depicting an exemplary embodiment of a method for retrieving a third PSS table AES-GCM key $K_{PT3DG}$.

FIG. 14 is a flowchart depicting an exemplary embodiment of method 1400 for retrieving a third PSS table AES-GCM key $K_{PT3DG}$. All segments of $K_{PT3DG}$ are broken into multiple pieces, which are stored mixed together and protected by the two-layer high-speed cipher key. Method 1400 decrypts and recovers one segment of a $K_{PT3DG}$ ($K_{PT3DGn}$) and is performed iteratively for n iterations, wherein n is the number of segments.

In step 1402, method 1400 decrypts the second PSS server table and retrieves the map for $K_{PT3DG}$.

In step 1404, method 1400 extracts the encrypted pieces that make up $K_{PT3DGn}$.

In step 1406, method 1400 recovers the current secrets for the two-layer high-speed cipher key needed to decrypt $K_{PT3DGn}$.

In step 1408, method 1400 decrypts $K_{PT3DGn}$.

In step 1410, method 1400 repeats steps 1402 through 1408 until all segments of $K_{PT3DG}$ are recovered.

Figure 15:
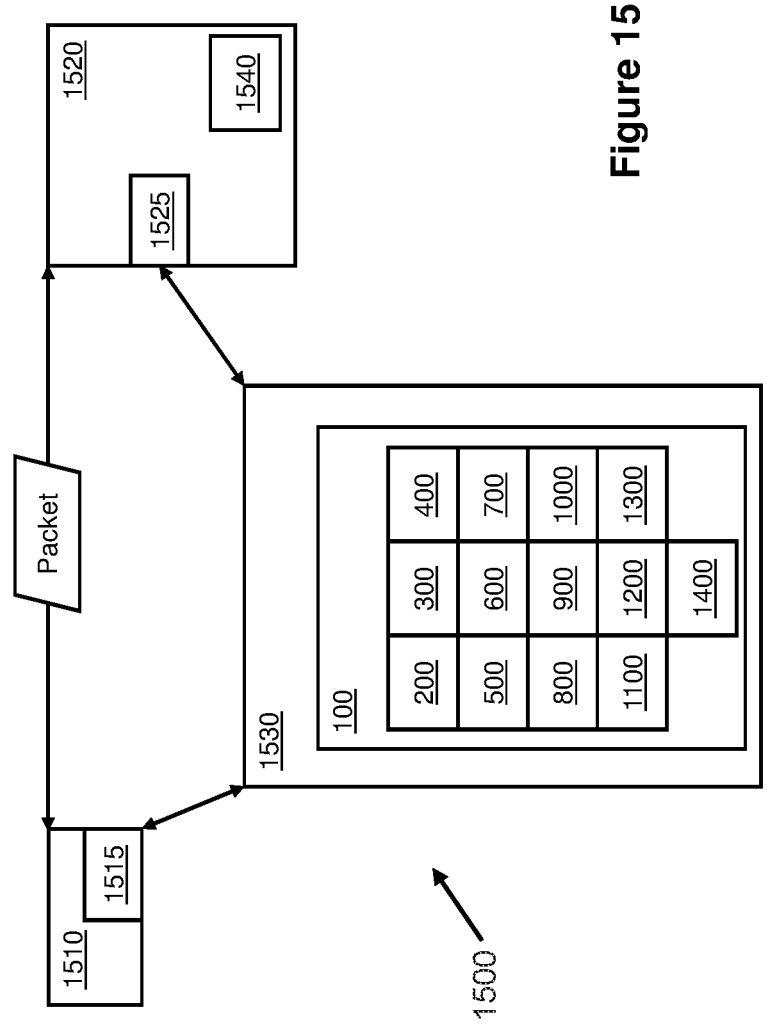
FIG. 15 is a system diagram of an exemplary embodiment of a system for preemptive, self-healing computer security.

FIG. 15 is a system diagram of an exemplary embodiment of system 1500 for preemptive, self-healing computer security. System 1500 includes a user device processor 1515 on a user device 1510, a PSS server processor 1525 on a PSS server 1520, and a non-transient computer readable medium 1530 operatively connected to user device processor 1515 and PSS server processor 1525. Medium 1530 is programmed with computer readable code that upon execution by user device processor 1515 and PSS server processor 1525 causes user device processor 1515 and PSS server processor 1525 to execute method 100 or specific portions thereof. Possible media include random access memory, read only memory, magnetic discs, optical discs, flash memory, virtual memory, and non-virtual memory, magnetic sets, magnetic tape, magnetic disc storage or other magnetic storage devices, or any other non-transient computer readable medium that can be used to storage the desired information and that may be accessed by an instruction execution system, as well as any combination or variation thereof, or any other type of storage medium.

A relational database 1540 stored on PSS server 1520 is used in method 1000. Relational database 1540 stores all relevant information extracted from a packet header and content. Relational database 1540 stores tables of the user PID and the user device PID as a B-tree index. Relational database 1540 also stores a login table, a state table and a log table. Information stored on these tables can be extracted to update SAC-WL and SAC-BL, and to trace attackers. The login table, state table and log table are encrypted with relational database key $K_{RD}$. $K_{RD}$ is a pseudo-random number generated using the PSS server PID, the user PID, and the user device nonce; thus, the $K_{RD}$ is updated every session. The state table stores the same information as the fourth user device table, with state PID as a B-tree index.

The login table includes verification results (i.e., whether the correct secret value was provided during login) for the user device authenticator encrypted by the PSS server next session key, the user device index, device nonce, and user PID encrypted by the user device next session key, the user device PID, the login trial number, a pseudo-random number generated using the user device DoS secret and login trial number, a pseudo-random number generated using the PSS server DoS secret and login trial number, the PSS server authenticator encrypted by the user device next session key, the PSS server authenticator, and the next session number and server PID encrypted by the PSS server next session key. If all of the correct secrets are provided during login, then the login succeeds; otherwise, forensics methods are used to determine which login secret is compromised.

The login table stores not only each secret's verification result but also the login results of previous two sessions. Since the first and third PSS server tables are protected as groups in the PSS server, the login table also records a first server table group ID and a third server table group ID, logging which $K_{PT1DG}$ and $K_{PT3DG}$ groups the user belongs to and allowing evaluation of whether the $K_{PT1DG}$ or the $K_{PT3DG}$ has been compromised. With the login table, forensics can detect multiple users' abnormal actions in the same protected group in order to determine the compromised secrets on server side. This detection can occur over time. For example, if different users in the same $K_{PT3DG}$ group had abnormal logins over two sessions, but none of the users in the same $K_{PT1DG}$ group had abnormal logins over three sessions, forensics can conclude that the $K_{PT3DG}$ was compromised.

When multiple users in the same group suffer similar attacks because of the same compromised secrets, a "shortcut" check procedure can be established to check the compromised secrets for other users in this group in order to reduce the time required for evaluation. Defending multiple stage attacks is based on the DSKM group relationship and the shortcut check procedure. The DSKM group relationship of compromised users and their devices can detect the time of first compromise and corresponding compromised secrets using any of the forensics methods. The shortcut check procedure can be dynamically established based on correlated events and thus multiple stage attacks can be identified using both DSKM and the shortcut check.

The log table includes the tab IDs of browser tabs as a hash index and also contains tab log tables for each browser tab opened on user device 1510. Each tab ID is a randomly generated unique ID for each open browser tab. The tab log table related to a particular browser tab will be terminated (or stop growing) when the user closes the tab or inputs new URL in this particular browser tab. If a packet has no relation to any open browser tab, it will be stored in a specific tab log table with an identifier. Since all logs with same tab ID are stored in one table, system 1500 only needs a single search to retrieve the tab log table for the tab desired to be analyzed.

Each tab log table contains a list of log items corresponding to packets received and/or sent by a particular browser tab. The tab log table includes the log IDs of logged packets as a B-tree index, the URL the packet was sent or received from, the time the packet was sent or received, the requesting and delivery domain name and IP address, any reference URL, a flag to indicate if a mouse event, such as click, is happened in the transit to the current URL, and whether the packet is an HTTPS or Hyper Text Transfer Protocol (HTTP) packet. If the packet is an HTTP packet, the tab log table also stores a flag to indicate whether the content is encrypted. The tab log table also stores the state before the current state in order to record the reason the packet is logged, as well as the reference tab ID, the parent of the current tab ID which provides the relationship between different tabs.

Because the relational database stores information in various related tables, instead of a single B-tree database, queries are limited to information logs from each open tab. This allows rapid searching and increases the ability of system 1500 to respond to attacks in real time. Querying correlated logs across multiple tabs is also more efficient because of the parent tab ID stored in the tab log table. The relational database is scalable, allowing the addition of more columns into the tab log table to connect not only other correlated tab log tables but also a specific log ID to further reduce the time required of real-time forensics. Real-time forensics method 1700 correlates the events based on information in relational database 1540 in order to rapidly track and trace the source of the attacks in real-time.

Figure 16:
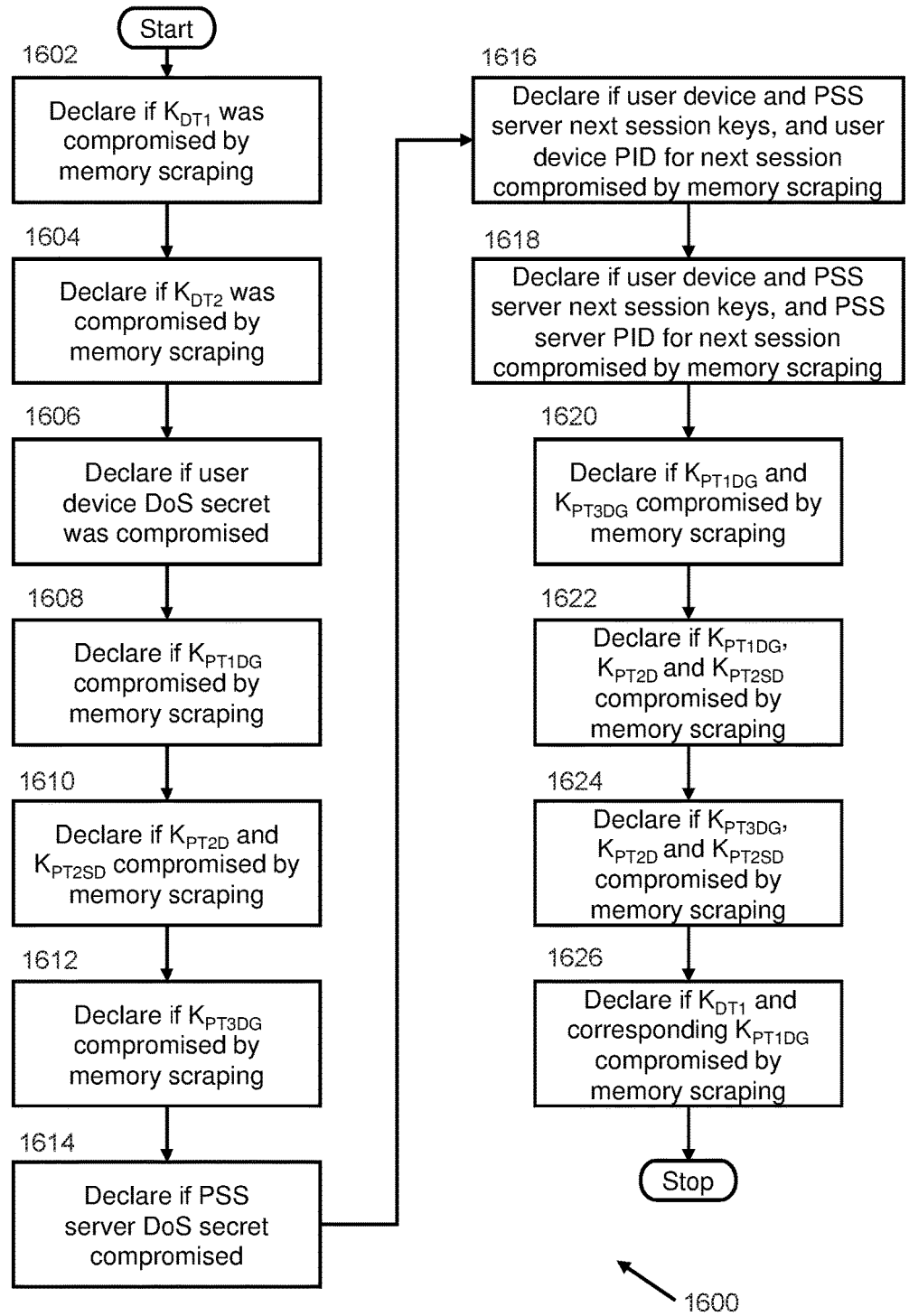
FIG. 16 is a flowchart depicting an exemplary embodiment of a method for memory scraping forensics.

FIG. 16 is a flowchart depicting an exemplary embodiment of method 1600 for memory scraping forensics.

In step 1602, method 1600 declares that a $K_{DT1}$ was compromised by memory scraping if a user device authenticator encrypted by a PSS server next session key for the current session, and a user device index, device nonce, and user PID encrypted by a user device next session key for the current session cannot be decrypted correctly by a PSS server.

In step 1604, method 1600 declares that a $K_{DT2}$ was compromised by memory scraping if a user device PID for the current session, a login trial number, and a pseudo-random number generated using a user device DoS secret for the current session and the login trial number are verified incorrectly by the PSS server.

In step 1606, method 1600 declares that the user device DoS secret was compromised by accessing a first PSS server table on the PSS server if a DoS attack was launched with a correct login trial number, pseudo-random number generated using the user device DoS secret, and login trial number to the PSS server.

In step 1608, method 1600 declares that a $K_{PT1DG}$ is compromised by memory scraping if multiple user devices report that: a pseudo-random number generated using a PSS server DoS secret for the current session and login trial number is correct; a PSS server authenticator encrypted by the user device next session key for the current session could be decrypted successfully, but the PSS server authenticator for the current session is incorrect; and a next session number and PSS server PID encrypted by the PSS server next session key for the current session is correct.

In step 1610, method 1600 declares that a $K_{PT2D}$ and a $K_{PT2SD}$ are compromised by memory scraping if a single user device reports that: the pseudo-random number generated using the PSS server DoS secret for the current session and login trial number is incorrect; the PSS server authenticator encrypted by the user device next session key for the current session could be decrypted successfully, but PSS server authenticator for the current session is incorrect; and the next session number and PSS server PID encrypted by the PSS server next session key for the current session is incorrect.

In step 1612, method 1600 declares that a $K_{PT3DG}$ is compromised by memory scraping if multiple user devices report that: the pseudo-random number generated using the PSS server DoS secret for the current session and login trial number is incorrect; and the PSS server authenticator encrypted by the user device next session key for the current session, and the next session number and PSS server PID encrypted by the PSS server next session key for the current session cannot be decrypted correctly.

In step 1614, method 1600 declares that the PSS server DoS secret is compromised if a DoS attack was launched with the correct login trial number and pseudo-random number generated using the PSS server DoS secret and login trial number to the user device.

In step 1616, method 1600 declares that the user device next session key, the PSS server next session key, and the user device PID for the next session are compromised by memory scraping if the next session login is successful, but in the subsequent session, the user device PID for the subsequent session is verified incorrectly in the PSS server.

In step 1618, method 1600 declares that the user device next session key, the PSS server next session key, and a PSS server PID for the next session are compromised by memory scraping if the next session login is successful, but in the subsequent session, the PSS server PID for the subsequent session is verified incorrectly in the user device.

In step 1620, method 1600 declares that $K_{PT1DG}$ and $K_{PT3DG}$ are compromised by memory scraping if multiple user devices in a $K_{PT1DG}$ group report that: the pseudo-random number generated using the PSS server DoS secret for the current session and login trial number is correct; the PSS server authenticator encrypted by the user device next session key for the current session could be decrypted successfully, but PSS server authenticator for the current session is incorrect; and the next session number and PSS server PID encrypted by the PSS server next session key for the current session is correct; and multiple user devices in a $K_{PT3DG}$ group report that: the pseudo-random number generated using the PSS server DoS secret for the current session and login trial number is incorrect; and the PSS server authenticator encrypted by the user device next session key for the current session, and the next session number and PSS server PID encrypted by the PSS server next session key for the current session cannot be decrypted correctly. This step is important because user devices in both $K_{PT1DG}$ and $K_{PT3DG}$ groups have a probability of connecting with an attacker's server without knowing. PSS server policies should force these users to re-register in a secure environment.

In step 1622, method 1600 declares that $K_{PT1DG}$, $K_{PT2D}$ and $K_{PT2SD}$ are compromised by memory scraping if multiple user devices report that: the pseudo-random number generated using the PSS server DoS secret for the current session and login trial number is correct; the PSS server authenticator encrypted by the user device next session key for the current session could be decrypted successfully, but PSS server authenticator for the current session is incorrect; and the next session number and PSS server PID encrypted by the PSS server next session key for the current session is correct.

In step 1624, method 1600 declares that $K_{PT3DG}$, $K_{PT2D}$ and $K_{PT2SD}$ are compromised by memory scraping if multiple user devices in a $K_{PT3DG}$ group report that: the pseudo-random number generated using the PSS server DoS secret for the current session and login trial number is incorrect; and the PSS server authenticator encrypted by the user device next session key for the current session, and the next session number and PSS server PID encrypted by the PSS server next session key for the current session cannot be decrypted correctly; and one user device protected by the compromised $K_{PT3DG}$ group, $K_{PT2D}$ and $K_{PT2SD}$ reports that: the pseudo-random number generated using the PSS server DoS secret for the current session and login trial number is incorrect; the PSS server authenticator encrypted by the user device next session key for the current session is correct; and the next session number and PSS server PID encrypted by the PSS server next session key for the current session cannot be decrypted correctly.

In step 1626, method 1600 declares that $K_{DT1}$ and corresponding $K_{PT1DG}$ are compromised by memory scraping if multiple user devices report that: the pseudo-random number generated using the PSS server DoS secret for the current session and login trial number is correct; the PSS server authenticator encrypted by the user device next session key for the current session could be decrypted successfully, but PSS server authenticator for the current session is incorrect; and the next session number and PSS server PID encrypted by the PSS server next session key for the current session is correct; and one PSS server reports that: the pseudo-random number generated using the user device DoS secret for the current session and login trial number is correct; the user device authenticator encrypted by the PSS server next session key for the current session could be decrypted successfully, but user device authenticator for the current session is incorrect; and the user device index, device nonce, and user PID encrypted by the user device next session key for the current session cannot be decrypted correctly.

Figure 17:
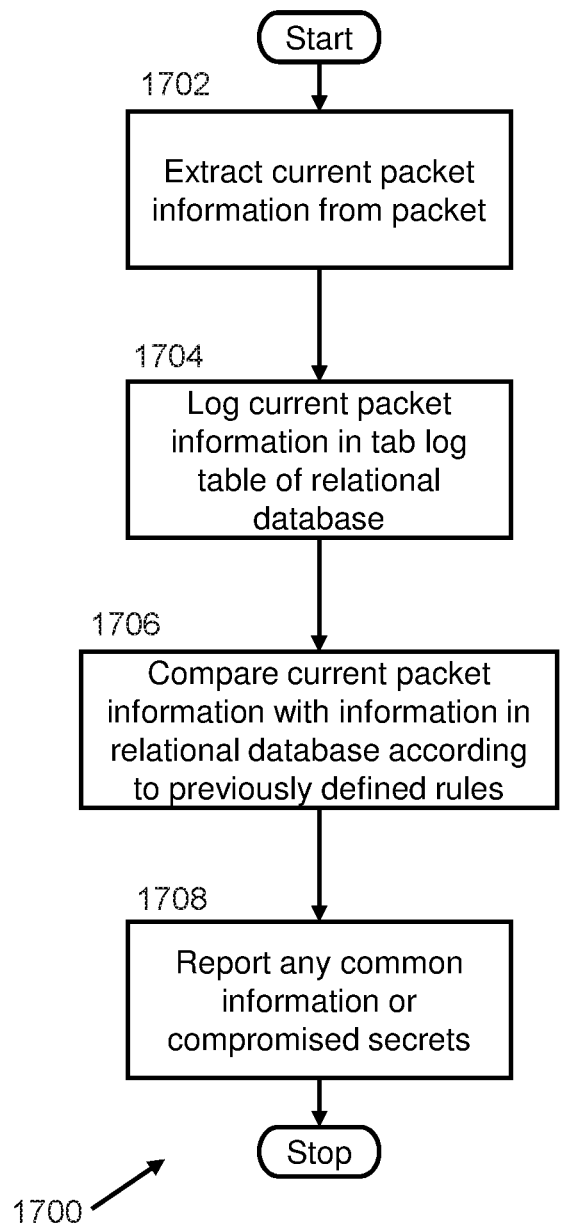
FIG. 17 is a flowchart depicting an exemplary embodiment of a method for real-time forensics.

FIG. 17 is a flowchart depicting an exemplary embodiment of method 1700 for real-time forensics.

In step 1702, method 1700 extracting current packet information from a packet. The packet information extract may be, but is not limited to, a log ID, a URL the packet was sent or received from, a time the packet was sent or received, a requesting and delivery domain name and IP address, a reference URL, a flag to indicate a mouse event, whether the packet is an HTTPS or HTTP packet, a flag to indicate whether content of the packet is encrypted, a state before the current state, and/or a reference tab ID.

In step 1704, method 1700 logs the current packet information in a tab log table of a relational database.

In step 1706, method 1700 comparing the current packet information with information in the relational database according to a list of previously defined rules to determine common information. These rules may include relational rules to allow method 1700 to rapidly correlate information in the relational database from multiple sessions, users, browser tabs, and tab logs. Such shortcut check procedures allow rapid assessments for information obtained from other users' sessions, browser tabs, and tab logs in order to reduce the time required for evaluation. Shortcut check procedures build index tables that point to types of state transitions (a series of previous and current states). This mimics a tab ID to correlate events during logging and expedite information retrieval during attack prevention.

In step 1708, method 1700 reports any common information. This report may take the form of an alert, updating a state or a portion of a database, making a record, or providing some other notification. Such alerts, updates, records, and notifications may be recorded or transmitted to the user, an administrator, or another third-party. The report may include the attack method, source, target, or any other relevant information.

FIG. 18*a* depicts the log table for a sample CSRF attack. FIG. 18*b* depicts the state table for the sample CSRF attack.

For the first log table entry of the sample CSRF attack, when a user's browser sends a silent request for the malicious form, it will be logged as suspicious since, by way of non-limiting example, this request is caused by an iframe (per step 608 of method 600). For the second log table entry of the sample CSRF attack, when the attacker site sends a malicious form to the user, it will be logged as suspicious because it is the corresponding response of the suspicious request from the first log table entry (per step 608 of method 600). For the third log table entry of the sample CSRF attack, when the user's browser sends a silent malicious form to the legitimate third-party site, it will be logged as suspicious because it sends an invisible form (per step 612 of method 600) and a CSRF attack is declared (per step 1102 of method 1100). The packet will also be blocked by method 500, leading to the state table shown in FIG. 18*b*.

Information extracted from the state and log tables could lead to new forensics results. By way of non-limiting example, the SAC-BL may be updated with the attacker site's domain name and IP address to subject packets to or from that site to additional scrutiny, per step 1004 or method 1000. The list of predetermined sites may be updated with the legitimate third-party site domain name and IP address to ensure that MitB attack prevention method 400 is always employed when accessing that site. The type of target data and type of attack may be used to employ specific additional security measures.

In the foregoing description, certain terms have been used for brevity, clearness, and understanding. No unnecessary limitations are to be inferred therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims.

What is claimed is:

1. A method for preemptive, self-healing computer security, comprising:
   activating a register Data Structure & Key Mutation (DSKM) protocol upon a user device login when the user device is a new user device, wherein the register DSKM establishes a secure connection between the user device and a Preemptive Self-healing System (PSS) server using a modified handshake, wherein the modified handshake authenticates the user device and the PSS server, further wherein the modified handshake provides a plurality of client secrets;
   activating an initial DSKM analysis, wherein the initial DSKM analysis mutates a plurality of user device table entries and a plurality of PSS table entries and encrypts a plurality of user device tables and a plurality of PSS tables using a plurality of table keys;
   activating an interval DSKM analysis at a predetermined interval, wherein, at the predetermined interval, the interval DSKM analysis mutates at least a portion of the plurality of PSS table entries, generates a plurality of new table keys, and reencrypts at least a portion of the plurality of PSS tables; and
   activating a Deep Protocol and Stateful Inspection and Prevention (DPSI) analysis when a packet is received or generated, wherein the DPSI analysis receives a packet and determines if the packet is potentially malicious.

2. The method of claim 1, wherein the initial DSKM analysis further includes:
   storing a plurality of client secrets on at least one of the plurality of user device tables, wherein the plurality of user device tables comprise at least a first user device table, a second user device table, a third user device table, and a fourth user device table;
   storing a plurality of network secrets on at least one of the plurality of PSS tables, wherein the plurality of PSS tables comprise at least a first PSS table, a second PSS table, a third PSS table, and a fourth PSS table;
   encrypting the first user device table with a first device table Galois/Counter Mode (AES-GCM) key KDT1;
   encrypting the second user device table with a second device table AES-GCM key KDT2;
   encrypting the third user device table with a third device table AES-GCM key KDT3;
   encrypting the fourth user device table with a user device high-speed cipher key;
   encrypting the first PSS table with a first PSS table AES-GCM key KPT1DG;
   dividing the plurality of network secrets on the first PSS table, the third PSS table, and the fourth PSS table into multiple groups in each table based on at least one secret stored in the first PSS table, the third PSS table, or the fourth PSS table;
   encrypting i groups in the first PSS table with i first PSS table AES-GCM keys KPT1DGi, wherein each KPT1DGi encrypts one group in the first PSS table;
   encrypting the first part of the second PSS table with a first partial second PSS table AES-GCM key KPT2D;
   encrypting the second part of the second PSS table with a second partial second PSS table AES-GCM key KPT2SD;
   encrypting k groups in the third PSS table with k third PSS table AES-GCM keys KPT3DGk, wherein each KPT3DGk encrypts one group in the third PSS table; and
   encrypting the fourth PSS table with a PSS high-speed cipher key.

3. The method of claim 2, wherein the user device high-speed cipher key is a self-evolving ChaCha key and the PSS high-speed cipher key is a self-evolving ChaCha key.

4. The method of claim 2, wherein each AES-GCM key is encrypted by a two-layer high-speed cipher key, wherein each layer of the two-layer high-speed cipher key alternately updates.

5. The method of claim 2, wherein the interval DSKM analysis further includes:
   shuffling at least one cookie to a random location in the third user device table;
   updating the at least one secret stored in the PSS tables;
   redividing the network secrets on the first PSS table, the third PSS table, and the fourth PSS table into multiple groups in each table based on the at least one secret stored in the first PSS table, the third PSS table, or the fourth PSS table;
   generating a new KPT2D, and a new KPT2SD;
   reencrypting the i groups in the first PSS table with the i KPT1DGi;
   reencrypting the first part of the second PSS table with the new KPT2D;
   reencrypting the second part of the second PSS table with the new KPT2SD; and
   reencrypting the k groups in the third PSS table with the k KPT3DGk.

6. The method of claim 1, further comprising activating a Man in the Browser (MitB) attack prevention analysis when the user requests a predetermined site, wherein the MitB attack prevention analysis includes:
   updating an encryption box key KEB;
   updating a Hyper Text Transfer Protocol (HTTP) session key KHS;
   transmitting the KHS from a user device to a PSS server;
   transmitting a request encrypted by the KHS from the user device to a third-party website;
   receiving a response including a plurality of input boxes from the third-party website to the PSS server;
   encrypting each of the plurality of input boxes with the KEB;
   transmitting each of the plurality of input boxes from the PSS server to the user device;
   verifying and displaying one of the plurality of input boxes on the user device;
   receiving user input in one of the plurality of input boxes on the user device;
   encrypting the user input with the KEB on the user device;
   repeating the steps of verifying and displaying one of the plurality of input boxes on the user device, receiving user input in one of the plurality of input boxes, and encrypting the user input with the KEB until each of the plurality of input boxes has received user input;
   transmitting the encrypted user input from the user device to the PSS server;
   decrypting and verifying the user input; and
   transmitting the verified user input to the third-party website.

7. The method of claim 1, wherein the DPSI analysis includes:
   receiving the packet;

initializing a packet log analysis upon receipt of the packet;

initializing a keylogger prevention analysis if the packet passes the packet log analysis, wherein the keylogger prevention analysis generates a one-time password (OTP) and verifies entry of the OTP;

initializing a Man in the Middle (MitM) attack detection analysis if the packet passes the keylogger prevention analysis, wherein the MitM attack detection analysis determines if a MitM attack has been detected with respect to the packet;

initializing a MitB packet attack detection analysis if the packet passes the MitM attack detection analysis, wherein the MitM attack detection analysis determines if a MitB attack has been detected with respect to the packet; and initializing a primary check analysis if the packet passes the MitB packet attack detection analysis, wherein the primary check analysis records a current state of a communication session with a Universal Resource Locator (URL) and determines how the packet is passed.

8. The method of claim 7, wherein the packet log analysis further includes:

logging the packet information in a tab log table of a relational database;

logging if the packet contains a link from an email or a website;

logging if the packet is generated by an external source;

logging if the packet is a request generated by a JavaScript and related response;

logging if the packet is generated by an invisible form or a hidden element in a visible form; and logging if the packet is generated without at least one open browser tab.

9. The method of claim 7, wherein the keylogger prevention analysis further includes:

requesting a one-time password (OTP) from a third-party website;

generating a keylogger prevention key KKL and a shuffle key KSF on a PSS server;

storing a hash-encrypted KKL on the PSS server;

sending an encrypted KKL and an encrypted KSF from the PSS server to the user device;

decrypting and verifying the KKL and the KSF on the user device;

reencrypting the KKL with a new logger prevention key the KKLC on the user device;

splitting the KKLC into a plurality of OTPs on the user device;

displaying the plurality of OTPs as a plurality of images on the user device;

receiving the plurality of OTPs and a password (PW) on the user device;

generating a half of the PW shuffled with the KKLC, a half of the PW shuffled with half of the KSF, and the KKLC shuffled with half of the KSF on the user device;

recovering half of the PW using the half of the PW shuffled with the KKLC on the user device;

transmitting the recovered half PW, the half of the PW shuffled with half of the KSF, the KKLC shuffled with half of the KSF, and the KKL encrypted with the KKLC from the user device to the PSS server;

recovering another half of the PW using the half of the PW shuffled with half of the KSF on the PSS server;

retrieving the KKLC using the KKLC shuffled with half of the KSF on the PSS server;

decrypting the KKL encrypted with the KKLC using the KKLC on the PSS server;

verifying the KKL with the hash-encrypted KKL on the PSS server;

generating a hash-encoded PW based on the received half of the PW and the recovered half of the PW on the PSS server; and transmitting the hash-encoded PW from the PSS server to the third-party website.

10. The method of claim 7, wherein the MitM attack detection analysis further includes:

determining whether a destination address for a packet matches a destination domain on a PSS server; and entering a warning state if the destination address does not match the destination domain.

11. The method of claim 7, wherein the MitB packet attack detection analysis further includes:

updating a Hyper Text Transfer Protocol Secure (HTTPS) session key KHS;

transmitting the KHS from a user device to a PSS server;

transmitting a request encrypted by the KHS from a user device to a third-party website;

transmitting a packet from the third-party website to the PSS server;

generating a first server keyed-hash message authentication code HMAC_S1 value for the packet;

transmitting the packet to the user device;

displaying the third-party website on the user device;

generating a first client keyed-hash message authentication code HMAC_C1 for a packet without user input;

generating a second client keyed-hash message authentication code HMAC_C2 for a packet containing user input;

transmitting the packet without user input and the packet containing user input to the PSS server;

comparing the HMAC_S1 to the HMAC_C1 and declaring a web injection MitB attack if the HMAC_S1 does not match the HMAC_C1;

generating a second server keyed-hash message authentication code HMAC_S2 for the packet containing user input;

comparing the HMAC_S2 to the HMAC_C2 and declaring a packet modification MitB attack if the HMAC_S2 does not match the HMAC_C2; and passing the packet containing user input to the third-party website if neither a web injection MitB attack nor a packet modification MitB attack are declared.

12. The method of claim 7, wherein the primary check analysis further includes:

passing the packet if the requesting and destination domain match a session access control white list;

entering a warning state if the requesting domain or destination domain match a session access control black list;

passing the packet if the requesting site and target site fall under the same-origin policy; and passing the packet if the packet does not include sensitive information.

13. The method of claim 7, further comprising passing the packet if the packet passes the keylogger prevention analysis, the MitM attack detection analysis, the MitB packet attack detection analysis, the MitM attack detection analysis, and the primary check analysis.

14. The method of claim 7, further comprising initializing a real-time forensics analysis, wherein the real-time forensics analysis enters a warning state if the packet does not pass the keylogger prevention analysis, the MitM attack detection analysis, the MitB packet attack detection analysis, or the primary check analysis.

15. The method of claim 14, wherein the real-time forensics analysis further includes:
   extracting current packet information from a packet, wherein the packet information is at least one value selected from the group consisting of: a log ID, a URL the packet was sent or received from, a time the packet was sent or received, a requesting and delivery domain name and Internet Protocol (IP) address, a reference URL, a flag to indicate a mouse event, a designation of the packet as one of a HTTPS packet or a HTTP packet, a flag to indicate whether content of the packet is encrypted, a state before the current state, and a reference tab ID;
   logging the current packet information in a tab log table of a relational database;
   comparing the current packet information with information in the relational database according to a list of previously defined rules to determine common information and any compromised secrets; and
   reporting any common information and any compromised secrets.

16. The method of claim 14, further comprising requesting additional information in the warning state.

17. The method of claim 16, further comprising passing the packet if the packet passes the warning state.

18. The method of claim 16, further comprising blocking and dropping the packet if the packet does not pass the warning state.

19. The method of claim 7, further comprising performing a further check analysis if the packet is not passed by the primary check analysis, wherein the further check analysis includes:
   passing the packet if user device follows a valid single sign-on policy;
   passing the packet if user device uses an Adobe cross-domain policy;
   declaring a Cross-site Scripting (XSS) attack and entering a warning state if the requesting domain is in a session access control white list; and
   declaring a Cross-Site Request Forgery (CSRF) attack and entering a warning state if the requesting domain is not in a session access control white list.

20. The method of claim 19, further comprising initializing a real-time forensics analysis, wherein the real-time forensics analysis enters a warning state if the packet does not pass the further check analysis.

21. A method for preemptive, self-healing computer security, comprising:
   activating a register Data Structure & Key Mutation (DSKM) protocol upon a user device login when the user device is a new user device, wherein the register DSKM establishes a secure connection between the user device and a PSS server using a modified handshake, wherein the modified handshake authenticates the user device and the PSS server, further wherein the modified handshake provides a plurality of client secrets;
   initializing an initial Data Structure & Key Mutation (DSKM) analysis, wherein the initial DSKM analysis mutates a plurality of user device table entries and a plurality of Preemptive Self-healing System (PSS) table entries and encrypts a plurality of user device tables and a plurality of PSS tables using a plurality of keys;
   initializing an interval DSKM analysis at a predetermined interval, wherein, at the predetermined interval, the interval DSKM analysis mutates at least a portion of the plurality of user device table entries and at least a portion of the plurality of PSS table entries, generates at least a plurality of new table keys, and reencrypts at least a portion of the plurality of PSS tables;
   initializing a Deep Protocol and Stateful Inspection and Prevention (DPSI) analysis when a packet is received or generated, wherein the DPSI analysis receives a packet and determines if the packet is potentially malicious;
   initializing a forensics analysis, wherein the forensics analysis determines if any of a plurality of secrets have been compromised; and
   initializing the interval DSKM analysis if the forensics method declares any of the secrets have been compromised, wherein the interval DSKM analysis mutates at least a portion of the plurality of user device table entries and at least a portion of the plurality of PSS table entries, generates plurality of new table keys, and reencrypts at least a portion of the plurality of PSS tables to initiate self-healing.

22. The method of claim 21, wherein the forensics analysis further includes performing at least one of a keylogger forensics analysis, wherein the keylogger forensics analysis determines if a keylogger attack has been successful, a memory scraping forensics analysis, wherein the memory scraping forensics analysis determines if the initial DSKM analysis or the interval DSKM analysis have been compromised by memory scraping, a cookie forensics analysis, wherein the cookie forensics analysis determines if the initial DSKM analysis or the interval DSKM analysis have been compromised, or a real-time forensics analysis, wherein the real-time forensics analysis identifies any compromised secrets.

23. The method of claim 22, wherein the keylogger forensics analysis includes:
   declaring that a OTP and a KKL are compromised if KKL verification in a PSS server is correct and decryption of a half of the hash-encoded PW in a user device is incorrect;
   declaring that a half of a PW shuffled with a half of the KSF and a half of the PW shuffled with the KKLC are compromised if KKL verification in the PSS server is incorrect and decryption of the half of the hash-encoded PW in a user device is correct;
   declaring that the PW shuffled with the KKLC is compromised if KKL verification in the PSS server and decryption of the half of the hash-encoded PW in the PSS server and the user device are all incorrect;
   declaring that the half of the PW shuffled with the KKLC, the OTP, and the KKL are compromised if KKL verification in the PSS server and decryption of the half of the hash-encoded PW in the user device are both correct and decryption of the half of the hash-encoded PW in the PSS server is incorrect;
   declaring that the half of the PW shuffled with the half of the KSF, the OTP, and the KKL are compromised if KKL verification in the PSS server and decryption of the half of the hash-encoded PW in the PSS server are both correct and decryption of the half of the hash-encoded PW in the user device is incorrect; and
   declaring that the PW shuffled with the KKLC, the OTP, and the KKL are compromised if decryption of the half of the hash-encoded PW in the PSS server and the user device are both incorrect, but KKL verification in the PSS server is correct.

24. The method of claim 22, wherein the memory scraping forensics analysis includes:
- declaring that a KDT1 was compromised by memory scraping if a user device authenticator encrypted by a PSS server next session key for the current session, and a user device index, device nonce, and user Pseudo-ID (PID) encrypted by a user device next session key for the current session cannot be decrypted correctly by a PSS server;
- declaring that a KDT2 was compromised by memory scraping if a user device PID for the current session, a login trial number, and a pseudo-random number generated using a user device Denial of Service (DoS) secret for the current session and the login trial number are verified incorrectly by the PSS server;
- declaring that the user device DoS secret was compromised by accessing a first PSS server table on the PSS server if a DoS attack was launched with a correct login trial number, pseudo-random number generated using the user device DoS secret, and login trial number to the PSS server;
- declaring that a KPT1DG is compromised by memory scraping if multiple user devices report that
  - a pseudo-random number generated using a PSS server DoS secret for the current session and login trial number is correct,
  - a PSS server authenticator encrypted by the user device next session key for the current session could be decrypted successfully, but the PSS server authenticator for the current session is incorrect, and
  - a next session number and PSS server PID encrypted by the PSS server next session key for the current session is correct;
- declaring that a KPT2D and a KPT2SD are compromised by memory scraping if a single user device reports that
  - the pseudo-random number generated using the PSS server DoS secret for the current session and login trial number is incorrect,
  - the PSS server authenticator encrypted by the user device next session key for the current session could be decrypted successfully, but PSS server authenticator for the current session is incorrect, and
  - the next session number and PSS server PID encrypted by the PSS server next session key for the current session is incorrect;
- declaring that a KPT3DG is compromised by memory scraping if multiple user devices report that
  - the pseudo-random number generated using the PSS server DoS secret for the current session and login trial number is incorrect, and
  - the PSS server authenticator encrypted by the user device next session key for the current session, and the next session number and PSS server PID encrypted by the PSS server next session key for the current session cannot be decrypted correctly;
- declaring that the PSS server DoS secret is compromised if a DoS attack was launched with the correct login trial number and pseudo-random number generated using the PSS server DoS secret and login trial number to the user device;
- declaring that the user device next session key, the PSS server next session key, and the user device PID for the next session are compromised by memory scraping if the next session login is successful, but in the subsequent session, the user device PID for the subsequent session is verified incorrectly in the PSS server;
- declaring that the user device next session key, the PSS server next session key, and a PSS server PID for the next session are compromised by memory scraping if the next session login is successful, but in the subsequent session, the PSS server PID for the subsequent session is verified incorrectly in the user device;
- declaring that KPT1DG and KPT3DG are compromised by memory scraping if multiple user devices in a KPT1DG group report that
  - the pseudo-random number generated using the PSS server DoS secret for the current session and login trial number is correct,
  - the PSS server authenticator encrypted by the user device next session key for the current session could be decrypted successfully, but PSS server authenticator for the current session is incorrect, and
  - the next session number and PSS server PID encrypted by the PSS server next session key for the current session is correct,
  - and multiple user devices in a KPT3DG group report that
  - the pseudo-random number generated using the PSS server DoS secret for the current session and login trial number is incorrect, and
  - the PSS server authenticator encrypted by the user device next session key for the current session, and the next session number and PSS server PID encrypted by the PSS server next session key for the current session cannot be decrypted correctly;
- declaring that KPT1DG, KPT2D and KPT2SD are compromised by memory scraping if multiple user devices report that
  - the pseudo-random number generated using the PSS server DoS secret for the current session and login trial number is correct,
  - the PSS server authenticator encrypted by the user device next session key for the current session could be decrypted successfully, but PSS server authenticator for the current session is incorrect, and
  - the next session number and PSS server PID encrypted by the PSS server next session key for the current session is correct;
- declaring that KPT3DG, KPT2D and KPT2SD are compromised by memory scraping if multiple user devices in a KPT3DG group report that
  - the pseudo-random number generated using the PSS server DoS secret for the current session and login trial number is incorrect, and
  - the PSS server authenticator encrypted by the user device next session key for the current session, and the next session number and PSS server PID encrypted by the PSS server next session key for the current session cannot be decrypted correctly,
  - and one user device protected by the compromised KPT3DG group, KPT2D and KPT2SD reports that
  - the pseudo-random number generated using the PSS server DoS secret for the current session and login trial number is incorrect,
  - the PSS server authenticator encrypted by the user device next session key for the current session is correct, and
  - the next session number and PSS server PID encrypted by the PSS server next session key for the current session cannot be decrypted correctly;

declaring that KDT1 and corresponding KPT1DG are compromised by memory scraping if multiple user devices report that
the pseudo-random number generated using the PSS server DoS secret for the current session and login trial number is correct,
the PSS server authenticator encrypted by the user device next session key for the current session could be decrypted successfully, but PSS server authenticator for the current session is incorrect, and
the next session number and PSS server PID encrypted by the PSS server next session key for the current session is correct,
and one PSS server reports that
the pseudo-random number generated using the user device DoS secret for the current session and login trial number is correct,
the user device authenticator encrypted by the PSS server next session key for the current session could be decrypted successfully, but user device authenticator for the current session is incorrect, and
the user device index, device nonce, and user PID encrypted by the user device next session key for the current session cannot be decrypted correctly.

25. The method of claim 22, wherein the cookie forensics analysis:
declaring that a KDT3 is compromised if all steps requiring a first PSS server table, a second PSS server table, a third PSS server table, and a fourth PSS server table are bypassed;
declaring that a KST2D is compromised if a user device nonce is not retrieved from a second user device table, a secondary user device authenticator is not retrieved from the third PSS server table, and a server device index is not retrieved from the first PSS server table;
declaring that a PSS secret for the user device is compromised if the user device nonce is not retrieved from the second user device table, the secondary user device authenticator is not retrieved from the third PSS server table, the server device index is not retrieved from the first PSS server table, and the PSS secret for the user device is not retrieved from the second PSS server table;
declaring that a cookie nonce is compromised if a user PID and a user device PID are not retrieved from the first PSS server table; and
declaring that a cookie PID is compromised if the user PID and the user device PID are not retrieved from the first user device table.

26. The method of claim 22, wherein the real-time forensics analysis includes:
extracting current packet information from a packet, wherein the packet information is at least one value selected from the group consisting of: a log ID, a URL the packet was sent or received from, a time the packet was sent or received, a requesting and delivery domain name and IP address, a reference URL, a flag to indicate a mouse event, whether the packet is an HTTPS or HTTP packet, a flag to indicate whether content of the packet is encrypted, a state before the current state, and a reference tab ID;
logging the current packet information in a tab log table of a relational database;
comparing the current packet information with information in the relational database according to a list of previously defined rules to determine common information and any compromised secrets; and
reporting any common information and any compromised secrets.

27. A system for preemptive, self-healing computer security, comprising:
a user device processor and a Preemptive Self-healing System (PSS) server processor;
a non-transitory computer readable medium operatively connected to the user device processor and the PSS server processor, and programmed with computer readable code that upon execution by the user device processor and the PSS server processor causes the user device processor and the PSS server processor to:
execute a register Data Structure & Key Mutation (DSKM) protocol upon a user device login when the user device is a new user device, wherein the register DSKM establishes a secure connection between the user device and the PSS server using a modified handshake, wherein the modified handshake authenticates the user device and the PSS server, further wherein the modified handshake provides a plurality of client secrets,
execute an initial DSKM analysis, wherein the initial DSKM analysis mutates a plurality of user device table entries and a plurality of PSS table entries and encrypts a plurality of user device tables and a plurality of PSS tables using a plurality of keys,
execute an interval DSKM analysis at a predetermined interval, wherein, at the predetermined interval, the interval DSKM analysis mutates at least a portion of the plurality of user device table entries and at least a portion of the plurality of PSS table entries, generates plurality of new table keys, and reencrypts at least a portion of the plurality of PSS tables, and
execute a Deep Protocol and Stateful Inspection and Prevention (DPSI) analysis when a packet is received or generated wherein the DPSI analysis receives a packet and determines if the packet is potentially malicious; and
a relational database stored on a PSS server, the relational database comprising a user PID table, a user device PID table, a login table, a state table, and a tab log table.

28. A method for preemptive, self-healing computer security, comprising:
activating a register Data Structure & Key Mutation (DSKM) protocol upon a user device login when the user device is a new user device, wherein the register DSKM establishes a secure connection between the user device and a Preemptive Self-healing System (PSS) server using a modified handshake, wherein the modified handshake authenticates the user device and the PSS server, further wherein the modified handshake provides a plurality of client secrets;
activating an initial DSKM analysis, wherein the initial DSKM analysis mutates a plurality of user device table entries and a plurality of PSS table entries and encrypts a plurality of user device tables and a plurality of PSS tables using a plurality of keys;
activating an interval DSKM analysis at a given interval, wherein, at the given interval, the interval DSKM analysis mutates at least a portion of the plurality of user device table entries and at least a portion of the plurality of PSS table entries, generates a plurality of new table keys, and reencrypts at least a portion of the plurality of PSS tables, wherein the given interval is an interval between a previous instance of performing the interval DSKM analysis and a user logging in; and activating a Deep Protocol and Stateful Inspection and Prevention (DPSI) analysis when a packet is received or generated, wherein the DPSI analysis receives a packet and determines if the packet is potentially malicious.

* * * * *